US012704836B2

(12) United States Patent
Natarajan et al.

(10) Patent No.: US 12,704,836 B2
(45) Date of Patent: Aug. 11, 2026

(54) LEARNING-BASED TECHNIQUES FOR AUTONOMOUS AGENT TASK ALLOCATION

(71) Applicant: Intel Corporation, Santa Clara, CA (US)

(72) Inventors: Venkataraman Natarajan, Bangalore (IN); Amala Sonny, Calicut Kerala (IN)

(73) Assignee: Intel Products IP LLC, Santa Clara, CA (US)

(*) Notice: Subject to any disclaimer, the term of this patent is extended or adjusted under 35 U.S.C. 154(b) by 38 days.

(21) Appl. No.: 17/546,158

(22) Filed: Dec. 9, 2021

(65) Prior Publication Data

US 2022/0100184 A1 Mar. 31, 2022

(51) Int. Cl.
*G05B 19/418* (2006.01)
*B25J 5/00* (2006.01)
(Continued)

(52) U.S. Cl.
CPC ........ *G05B 19/41895* (2013.01); *B25J 5/007* (2013.01); *B25J 9/1676* (2013.01); (Continued)

(58) Field of Classification Search
CPC ............ G05B 19/41895; G05B 19/418; G05B 2219/33056; G05B 2219/39117; G05B 2219/40518; B25J 5/007; B25J 9/1676; B25J 9/1664; B25J 9/1682; B25J 9/0084; B25J 9/16; G06F 9/50; G06N 3/008; G06N 3/09; G06N 3/0499
See application file for complete search history.

(56) References Cited

U.S. PATENT DOCUMENTS

2008/0009966 A1* 1/2008 Bruemmer ........... G05D 1/0274 700/245
2015/0160654 A1* 6/2015 Nakamura ............. G05D 1/024 701/23

(Continued)

FOREIGN PATENT DOCUMENTS

CN 111126860 A * 5/2020 ....... G06Q 10/06311
CN 113159506 A * 7/2021 ............. G06N 3/006

(Continued)

OTHER PUBLICATIONS

G. Thomas, A. M. Howard, A. B. Williams and A. Moore-Alston, “Multirobot task allocation in lunar mission construction scenarios,” 2005 IEEE International Conference on Systems, Man and Cybernetics, Waikoloa, HI, USA, Oct. 2005, pp. 518-523 vol. 1 (Year: 2006).*

(Continued)

*Primary Examiner* — Ramon A. Mercado
*Assistant Examiner* — Tyler Roger Robarge
(74) *Attorney, Agent, or Firm* — Banner & Witcoff, Ltd.

(57) ABSTRACT

Techniques are disclosed to perform task allocation for autonomous systems by implementing machine-learning to perform task allocation to Autonomous Mobile Robots (AMRs) in an environment. The disclosed techniques also provide for enhanced path planning and the identification of AMR health and failure prediction to further improve upon task allocation and system efficiency.

24 Claims, 20 Drawing Sheets

(51) Int. Cl.
*B25J 9/16* (2006.01)
*G06F 9/50* (2006.01)

(52) U.S. Cl.
CPC .............. *G06F 9/50* (2013.01); *G05B 19/418* (2013.01); *G05B 2219/33056* (2013.01)

(56) References Cited

U.S. PATENT DOCUMENTS

2015/0185729 A1* 7/2015 Kuffner, Jr. ............ B25J 9/0084 700/248
2015/0197010 A1* 7/2015 Ruuspakka .......... G05D 1/0005 700/245
2019/0383624 A1* 12/2019 Magzimof ........... H04B 17/373
2020/0150687 A1* 5/2020 Halder ................... G05D 1/648
2020/0264629 A1* 8/2020 Maveddat ............ G05D 1/0276
2020/0338733 A1* 10/2020 Dupuis .................. B25J 9/1666
2020/0394929 A1* 12/2020 Neubauer ................ G08G 5/55
2021/0080965 A1 3/2021 Starr et al.
2021/0107152 A1 4/2021 Honkote et al.
2021/0146531 A1* 5/2021 Tremblay ............... G06N 3/006
2021/0302956 A1* 9/2021 Sudhakaran ......... G05D 1/0027
2022/0048186 A1* 2/2022 Sharma ............... G06F 11/3006
2022/0226994 A1* 7/2022 Gombolay ............. B25J 9/1682
2022/0304227 A1* 9/2022 Hill .................... A01D 41/1278
2022/0318720 A1* 10/2022 Li .................... G06Q 10/06316
2023/0041313 A1* 2/2023 Oshiro ..................... B65G 1/04
2023/0059004 A1* 2/2023 Badia ..................... G06N 3/006
2023/0109096 A1* 4/2023 Cella ...................... B25J 9/1674 702/184
2023/0152816 A1* 5/2023 Narang .................. G06V 20/56 701/410
2023/0259878 A1* 8/2023 Jacquemart .......... G06Q 10/087 705/28
2023/0341850 A1* 10/2023 Cella ....................... B22F 10/85
2023/0342684 A1* 10/2023 Cella ..................... B29C 64/393
2024/0160229 A1* 5/2024 Rana ...................... G05D 1/693

FOREIGN PATENT DOCUMENTS

WO WO-2022032444 A1 * 2/2022 ............... G05D 1/02
WO WO-2022227352 A1 * 11/2022 ............. G06T 17/00

OTHER PUBLICATIONS

A. Farinelli, L. Iocchi, D. Nardi and V. A. Ziparo, “Assignment of Dynamically Perceived Tasks by Token Passing in Multirobot Systems,” in Proceedings of the IEEE, vol. 94, No. 7, pp. 1271-1288, Jul. 2006 (Year: 2006).*

M. Xue, W. Sun, H. Yu, H. Tang, A. Lin and Z. Zhou, “Heterogeneous Self-Organizing Map for Multi-type Tasks Allocation with Multirobot in Different Task Modes,” 2018 Chinese Automation Congress (CAC), Xi’an, China, Dec. 2018, pp. 13-18 (Year: 2018).*

O. Al-Buraiki and P. Payeur, “Probabilistic Task Assignment for Specialized Multi-Agent Robotic Systems,” 2019 IEEE International Symposium on Robotic and Sensors Environments (ROSE), Ottawa, ON, Canada, Jun. 2019, pp. 1-7 (Year: 2019).*

Z. Wang and M. Gombolay, “Learning Scheduling Policies for Multi-Robot Coordination With Graph Attention Networks,” in IEEE Robotics and Automation Letters, vol. 5, No. 3, pp. 4509-4516, Jul. 2020 (Year: 2020).*

Huang C, Liu R. Robot inner attention modeling for task-adaptive teaming of heterogeneous multi robots. arXiv preprint arXiv:2006.15482. Jun. 28, 2020. (Year: 2020).*

O. Al-Buraiki and P. Payeur, “Task Allocation in Multi-Robot Systems Based on the Suitability Level of the Individual Agents,” 2021 IEEE 17th International Conference on Automation Science and Engineering (CASE), Lyon, France, Aug. 2021, pp. 209-214 (Year: 2021).*

O. Al-Buraiki and P. Payeur, “Probabilistic Task Assignment for Specialized Multi-Agent Robotic Systems,” 2019 IEEE International Symposium on Robotic and Sensors Environments (ROSE), Ottawa, ON, Canada, 2019, pp. 1-7 (Year: 2019).*

Mar. 4, 2023 (EP) European Search Report—App. 22205681.4.

Z. Wang et al: “Learning to Dynamically Coordinate Multi-Robot Teams in Graph Attention Networks”, Arxiv. Org., Cornell University Library, 201 Olin Library Cornell University Ithaca, NY 14853, Jun. 28, 2020.

M. Xue et al: “Heterogeneous Self-Organizing Map for Multi-type Tasks Allocation with Multirobot in Different Task Modes”, 2018 Chinese Automation Congress (CAC), IEEE, Nov. 30, 2018, pp. 13-18.

B. Peng et al: “Multi-Robot Competitive Tracking Based on k-WTA Neural Network with One Single Neuron”, Neurocomputing, Elsevier, Amsterdam, NL, vol. 460, Jul. 7, 2021, pp. 1-8.

A. Farinelli et al: “Assignment of Dynamically Perceived Tasks by Token Passing in Multirobot Systems”, Proceedings of the IEEE, IEEE. New York, US, vol. 94, No. 7, Jul. 1, 2006, pp. 1271-1288.

Jang, I., Shin, H.S., and Tsourdos, A. (2016). Anonymous hedonic game for task allocation in a large-scale multiple agent system. IEEE Transactions on Robotics, (2018).

Tereshchuk, V., Stewart, J., Bykov, N., Pedigo, S., Devasia, S., Banerjee, A.G.: An efficient scheduling algorithm for multi-robot task allocation in assembling aircraft structures. arXiv preprint arXiv:1902.08905 (2019).

Markus Jäger and Bernhard Nebel. Decentralized collision avoidance, deadlock detection, and deadlock resolution for multiple mobile robots. In Proceedings of IROS’01, pp. 1213-1219, Maui, HI, USA, Oct. 2001.

M. C. Gombolay, R. J. Wilcox, and J. A. Shah, “Fast scheduling of robot teams performing tasks with temporospatial constraints,” IEEE Trans. Robot., vol. 34, No. 1, pp. 220-239, Feb. 2018.

Zhang, Y., & Parker, L. E. (2013). Multi-robot task scheduling. In Proceedings of the IEEE International Conference on Robotics and Automation (ICRA), pp. 2992-2998. IEEE.

M. Dadvar, S. Moazami, H. R. Myler, and H. Zargarzadeh, “Multiagent task allocation in complementary teams: a hunter-and-gatherer approach,” Complexity, vol. 2020, Article ID 1752571, 15 pages.

Z. Yan, N. Jouandeau, A. Ali Cherif, A survey and analysis of multi-robot coordination, Int. J. Adv. Robot. Syst. 10(399) (2013).

Zhou, L., et al., A Balanced Heuristic Mechanism for Multirobot Task Allocation of Intelligent Warehouses, Hindawi Publishing Corporation Mathematical Problems in Engineering vol. 2014, Article ID 380480, 10 pages—http://dx.doi.org/10.1155/2014/380480.

* cited by examiner

502

502.1 502.2 502.3

502.4 AMR 102 502.5 502.6

Figure 8C:
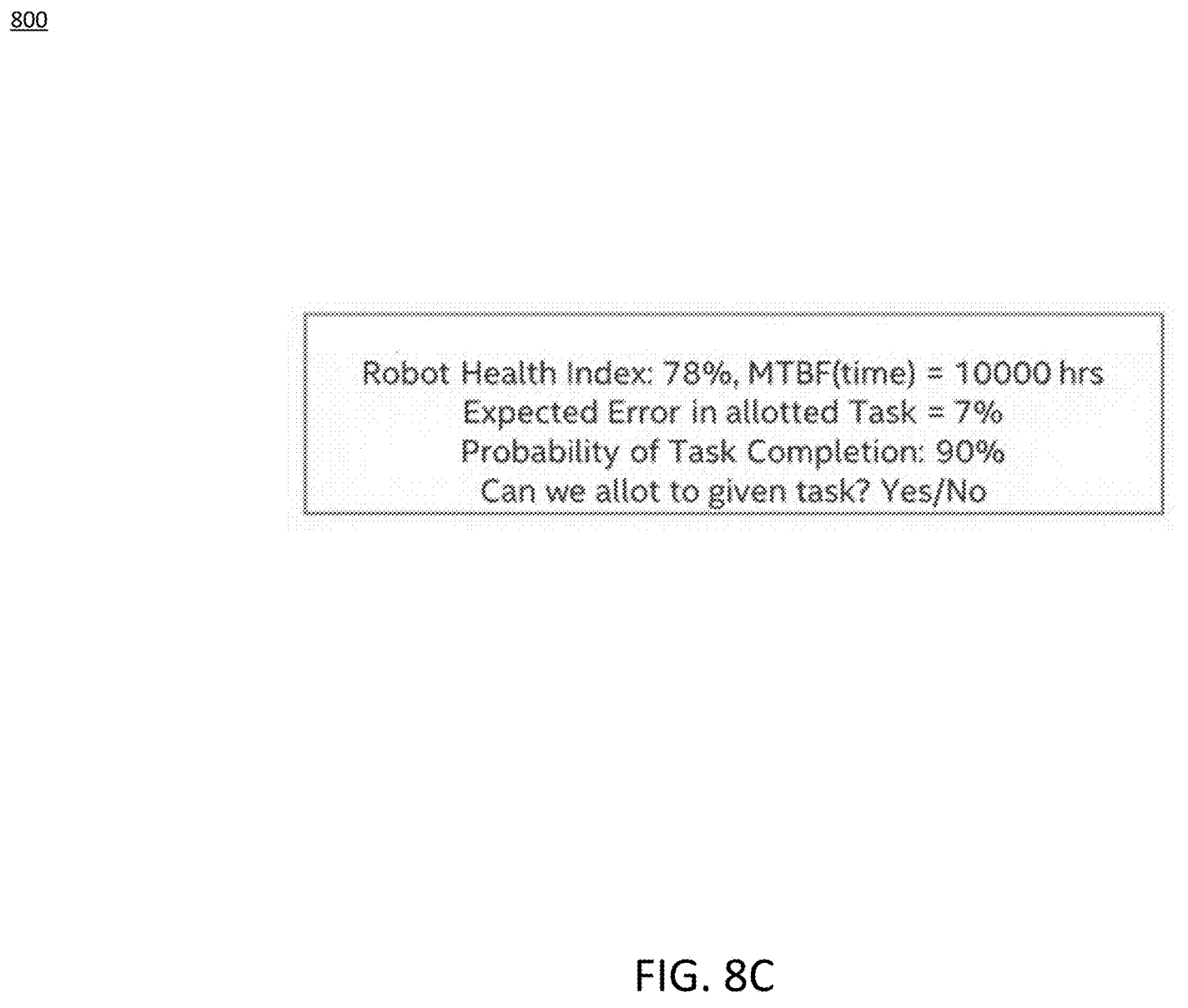

Robot Health Index: 78%, MTBF(time) = 10000 hrs
Expected Error in allotted Task = 7%
Probability of Task Completion: 90%
Can we allot to given task? Yes/No

Figure 10:
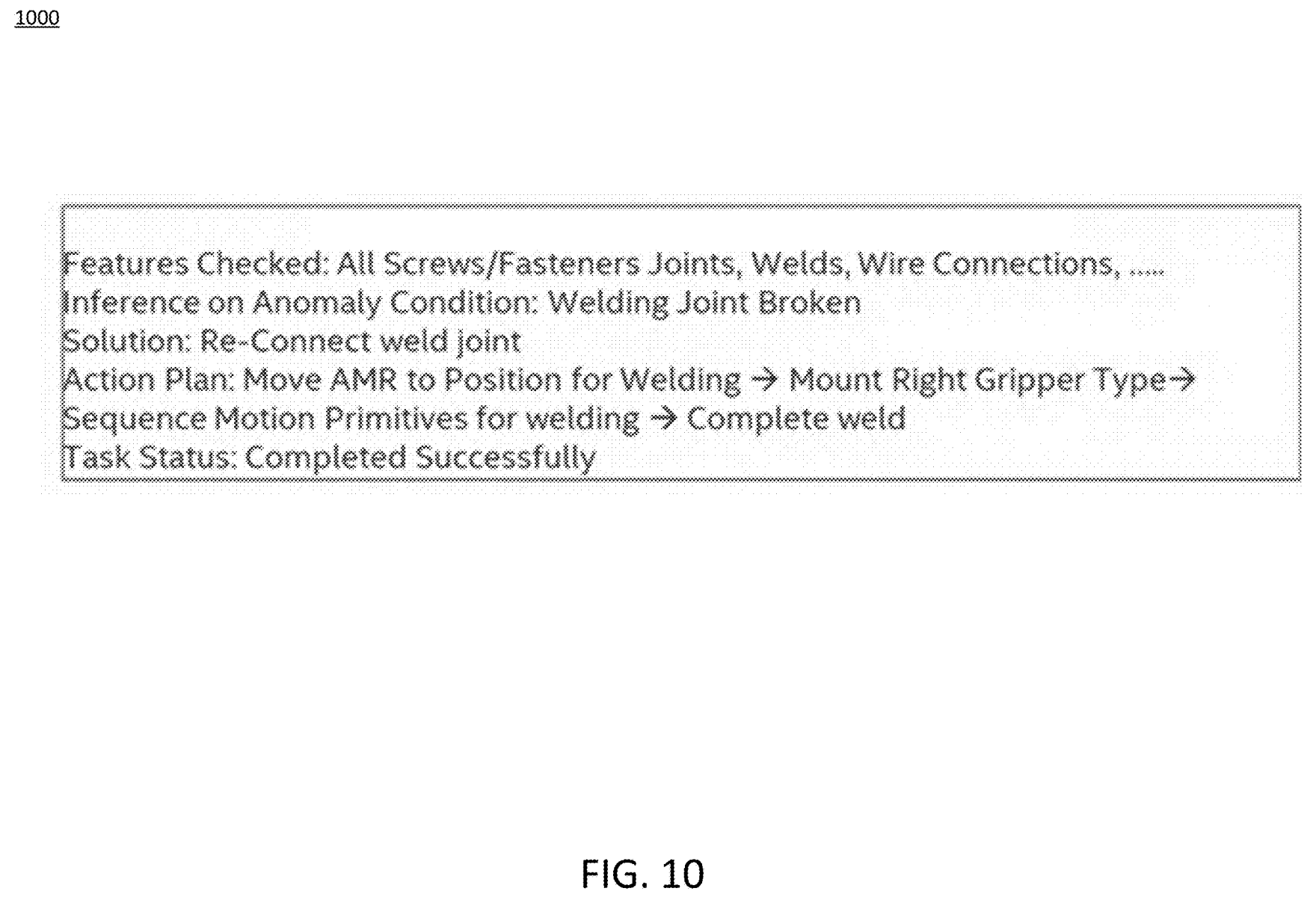

Features Checked: All Screws/Fasteners Joints, Welds, Wire Connections, .....
Inference on Anomaly Condition: Welding Joint Broken
Solution: Re-Connect weld joint
Action Plan: Move AMR to Position for Welding → Mount Right Gripper Type→
Sequence Motion Primitives for welding → Complete weld
Task Status: Completed Successfully

| Method\No of Robots Allocated | 12 | 14 | 16 | 18 | 20 | 22 | 24 | 26 | 28 | 30 | 32 |
|---|---|---|---|---|---|---|---|---|---|---|---|
| Grape | 5.12 | 6.08 | 7.66 | 9.119 | 12.2 | 13.318 | 15.77 | 22.216 | 23.157 | 25.95 | 39.075 |
| DL Testing | 2.18E-03 | 2.43E-03 | 2.21E-03 | 2.13E-03 | 3.17E-03 | 3.17E-03 | 2.52E-03 | 2.59E-03 | 2.57E-03 | 2.95E-03 | 3.58E-03 |
| **Latency Benefits** | **2350X** | **2500X** | **3470X** | **4280X** | **3585X** | **4200X** | **6260X** | **8580X** | **9010X** | **8800X** | **10900X** |

FIG. 15

LEARNING-BASED TECHNIQUES FOR AUTONOMOUS AGENT TASK ALLOCATION

TECHNICAL FIELD

Aspects described herein generally relate to task allocation for autonomous systems and, more particularly, to techniques implementing machine-learning to perform task allocation to autonomous agents in an environment.

BACKGROUND

The upcoming "Industry 4.0" paradigm is using computing, communication, and AI technologies to increase automation efficiency, reduce energy use, and improve safety for human workers. Autonomous Mobile Robots (AMRs) are key components in factories and warehouses to meet these needs. In accordance with such use cases, AMRs implement perception and manipulation to accomplish allocated tasks by navigating an environment while communicating and coordinating with one another as well as with a central entity. This coordination requires bounded latency, reliable communications, and computing power, which is typically handled in a networked environment that services the AMR environment. However, current techniques to support AMR task allocation and path planning in such environments have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 5E illustrates a grouping of grid cells demonstrating the calculation of a congestion factor, in accordance with the disclosure.

FIG. 8C illustrates a dashboard of various metrics regarding the health and error probabilities of an AMR, in accordance with the disclosure.

FIG. 10 illustrates a dashboard of various metrics regarding the identification of tasks via sensor data acquisition, in accordance with the disclosure.

FIG. 15 illustrates a table comparison between the performances of a DL-based resource allocation algorithm to that of a conventional algorithm, in accordance with the disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
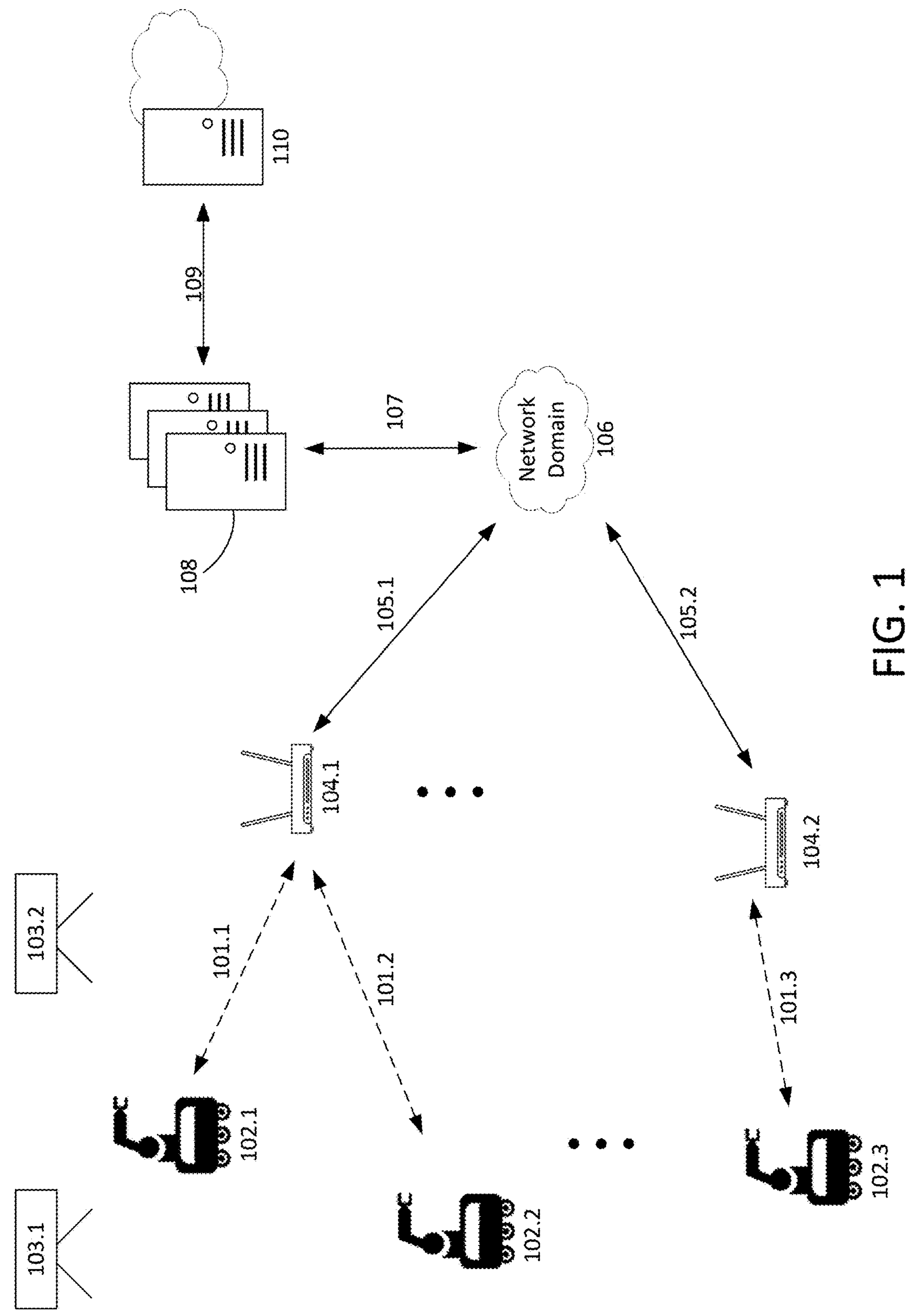
FIG. 1 illustrates a block diagram of an environment utilizing autonomous mobile robots (AMRs), in accordance with the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, current techniques for performing AMR task allocation and path planning have various drawbacks. For instance, several emerging AI-based industrial applications require MRTA systems in which a large number of robots collaboratively perform complex tasks in an industrial environment. However, industrial robots require sophisticated designs to perform precision manipulation tasks and operations, and are expensive to design, purchase, and repair. Thus, robots in a factory are often few and limited in number, and need to be efficiently and intelligently assigned to factory tasks while being shared continuously across a range of tasks. Several different computational methods (e.g. optimization-based such as genetic algorithms, ant colony, etc.) have been explored for multi-robot task allocation in which one algorithmically allocates and assigns robots to tasks based on task specifications. However, such conventional algorithms are challenging to deploy as these require complex mathematical formulations customized to specific task scenarios, are difficult to debug, are computationally intensive, and are unsuitable for deployment in practical systems involving a large system of robots. The complexity of the algorithm is further augmented in systems involving heterogeneous robots, which can result in multi-robot allocation solutions that are sub-optimal, inefficient, and impractical. Conventional learning-based task allocation approaches are mainly reinforcement learning-based complex models, are hard to scale to large robot systems with many input parameters due to complex reward structures and high state-space dimensionality, are not easily adaptable, and require new models retraining for new tasks.

Furthermore, conventional multi-robot multi-task resource allocation have mainly focused on optimization-based algorithms such as particle Swarm optimization, MILP (Mixed Integer Linear Programming), Genetic Algorithms, and Market-Based algorithms. One such conventional solution includes the "Efficient Scheduling Algorithm for Multi-Robot Task Allocation in Assembling Aircraft Structures, Tereshchuk, V., Stewart, J., Bykov, N., Pedigo, S., Devasia, S., Banerjee, A. G.: An efficient scheduling algorithm for multi-robot task allocation in assembling aircraft structures. arXiv preprint arXiv: 1902.08905 (2019), which deals with efficient utilization of cooperating AMRs in the assembly of aircraft structures by balancing the workload of the AMRs and ensuring collision-free scheduling. This algorithm handles failures by allowing the AMRs to first complete their nominal schedules, and then employing a market-based optimizer to allocate the leftover tasks. Thus, this algorithm implements a dual-stage scheduling approach, where a conflict-free, balanced nominal schedule is first generated that avoids the need for immediate rescheduling after failure instances and, in the second stage, the tasks leftover during the failures are reallocated using a market-based optimizer to enable efficient, collision-free cooperation.

Additional conventional systems include the "Fast Scheduling of Robot Teams performing tasks with Temporospatial Constraints," which is a centralized algorithm that uses a system named "Tercio," which handles tightly-intercoupled temporal and spatial constraints. Tercio is a multi-agent task sequencer inspired by real-time processor scheduling techniques and adapted to leverage a hierarchical problem structure. Tercio is essentially a task sequencer in conjunction with an MILP solver that computes an integrated multi-agent task sequence.

Still further conventional systems include the use of an anonymous hedonic game for task allocation in a large-scale multiple agent system. GRoup Agent Partitioning and Placing Event (GRAPE) is Game-theoretical autonomous decision-making framework that addresses task allocation problems for a group of self-interested agents. GRAPE utilizes local interactions with neighbor agents under a strongly-connected communication network, even in asynchronous environments. Here, the task allocation problem is modeled as a coalition-formation. The GRAPE algorithm is optimization-based, scalable to large systems, is computationally intensive, and suitable for edge-enhancement.

However, each of these conventional systems suffers from various drawbacks, which the techniques described further herein address. In particular, the aforementioned conventional algorithms are challenging to deploy as these require complex formulations that are difficult to model and arduous to adapt, reconfigure, and customize to specific task scenarios. Moreover, these conventional algorithms are difficult to debug and are computationally intensive in practical systems involving large numbers (i.e. hundreds or thousands) of AMRs. Moreover, the heterogeneous requirements of the tasks makes the mathematical model formulation complex and difficult, and thus such algorithms are unsuitable for practical deployment and scalability in large robotic systems. The complexity of the algorithms may also result in difficulties to identify a globally-optimal solution, and also result in AMR sharing schemes that are sub-optimal, inefficient, and impractical. Finally, the market based, particle swarm based, and MILP based algorithms are efficient only for offline allocation, and are of limited use in practical situations in which one requires dynamic re-sharing of resources after the completion of certain tasks.

The techniques described in further detail herein provide various solutions, which may be implemented individually or in combination, to address these aforementioned conventional AMR task allocation and path planning issues, among others. As discussed in further detail herein, the disclosure describes techniques related to a Deep Learning-based AMR allocation solution that is model-free, easy to deploy, scales to large robotic systems, and provides a practical alternative to the optimization-based task allocation approaches.

The solutions discussed in further detail below implement a Deep Learning neural network that allocates AMRs to tasks based on high level task inputs and AMR state and availability information. Once the AMRs are allocated to specific tasks, the techniques as further described herein optionally implement enhanced path-planning algorithms to route the AMRs to the respective task locations. Once, the task begins execution, the techniques described herein further include monitoring the task progress and AMR actions. The continuous monitoring of tasks and AMR actions facilitates a quick response to any AMR performance-related malfunctions, battery life issues, etc. Moreover, once an AMR completes its task, it is re-assigned to a new task by a task allocation engine as described herein, and thus the AMRs are continuously and efficiently assigned to tasks autonomously. In addition, in the techniques discussed herein, the task allocation engine provides additional logic to support urgent unexpected scenarios such as robot malfunctions or low battery etc., which may require emergency AMR back-up.

The disclosure also describes techniques for algorithmically generating AMR task allocation training datasets, which are used to train the DL neural network that performs the task allocation processes. As further discussed herein, this implementation is utilized because the allocation of AMRs to tasks is determined by several factors such as task parameters (which may include start/stop times, task deadlines, manipulation parameters, task priority and sequence, etc.) and AMR state parameters and availability information (such as the number of assigned and unassigned AMRs, the AMR's current action sequence, idle times, the physical location of AMRs with respect to task location, battery life remaining, the distance to charging stations, etc.). To enable the training dataset creation, task priority parameters are defined to quantify the priority of a given task amongst a set of tasks, as well as cost parameters that correspond to the cost incurred due to allocating a specific AMR to a given task and, finally, a reward metric for every AMR-task set that is the result of combining the task priority parameters and the cost parameters. The reward metrics may thus be calculated for each task that is to be allocated by calculating a reward metric for each AMR for each task. Then, each task may be allocated to the AMRs for each task having the highest reward metric value, which thus represents the "best" AMR to perform each task.

An Operating AMR Environment

FIG. 1 illustrates a block diagram of an environment utilizing autonomous mobile robots (AMRs), in accordance with the disclosure. The AMRs may alternatively be referred to herein as autonomous agents. As shown in FIG. 1, the environment 100 supports any suitable number N of AMRs 102, with three AMRs 102.1-102.3 being shown for ease of explanation. The environment 100 may be any suitable type of environment that uses the AMRs 102, such as a factory, a warehouse, etc. The AMRs 102 may have any suitable type of design configured to perform any suitable number of various tasks, as further discussed herein. Each of the AMRs 102 may be configured to communicate with other components of a network infrastructure as further discussed below. The AMRs 102 may operate autonomously or semi-autonomously and be configured as mobile robots that navigate within the environment 100 to complete specific tasks, which may be allocated to the AMRs 102 and/or identified independently by the AMRs 102 while operating within the environment 100.

The AMRs 102 may include any suitable number and/or type of sensors to enable sensing of their surroundings and the identification of feedback regarding the environment 100. The AMRs 102 may further be configured with any suitable number and/or type of wireless radio components to facilitate the transmission and/or reception of data. The AMRs 102 may transmit data to the computing device 108 (or other suitable components within the environment 100) indicative of current tasks being executed, new tasks to be executed, and/or other detected conditions within the environment 100, and may additionally or alternatively transmit any suitable type of state-related data such as an identified location, orientation, velocity, trajectory, heading, battery life, etc. within the environment 100. The AMRs 102 may also receive commands (which may be in the form of transmitted control signals) with respect to allocated tasks to perform as well as the details associated with how and when to perform the allocated tasks, and/or planned path information from the computing device 108 (or other suitable components within the environment 100). Upon being allocated to a particular task, each AMR 102 may execute the task in accordance with the task parameters identified with that particular type of task. This may include an AMR 102 performing a gripping motion in accordance with a specific trajectory, picking up and/or placing down objects, moving objects to a particular location within the environment 100, navigating to other parts of the environment 100, etc. Although not shown in FIG. 1 for purposes of brevity, the AMRs 102 may optionally communicate with one another to determine information (such as current tasks being executed, location, orientation, velocity, trajectory, heading, etc.) with respect to the other AMRs 102, as well as other information such as sensor data generated by other AMRs 102.

Although the environment 100 is described herein as a factory or warehouse that supports AMRs 102 operating within such an environment, this is a non-limiting scenario. The implementations as described herein may be performed in accordance with any suitable type of environment and/or type of autonomous agent. That is, the environment 100 may be outdoors and be identified with a region such as a roadway that is utilized by autonomous vehicles. Thus, the implementations described herein may be applicable to AMRs as well as other types of autonomous agents that may operate in any suitable type of environment based upon any suitable application or desired function.

The AMRs 102 operate within the environment 100 by communicating with the various components of the supporting network infrastructure to receive allocated tasks, perform tasks, and/or transmit state-related information and other suitable feedback as noted herein. The network infrastructure may include any suitable number and/or type of components to support communications with the AMRs 102. The network infrastructure may include any suitable combination of wired and/or wireless networking components that operate in accordance with any suitable number and/or type of communication protocols. The network infrastructure may include interconnections using wired links such as Ethernet or optical links, as well as wireless links such as Wi-Fi (e.g. 802.11 protocols) and cellular links (e.g. 3GPP standard protocols, LTE, etc.). The network infrastructure may be implemented as an access network, an edge network, a mobile edge computing (MEC) network, etc. In the environment 100 as shown in FIG. 1, the network infrastructure includes one or more cloud server(s) 110 that enable a connection to the Internet, which may be implemented as any suitable number and/or type of cloud computing devices. The network infrastructure may additionally include a computing device 108, which may be implemented as any suitable number and/or type of computing device such as a server that may form part of a cellular node. The computing device 108 may be implemented as an Edge server and/or Edge computing device.

The computing device 108 may communicate with the one or more cloud server(s) 110 via one or more links 109, which may represent an aggregation of any suitable number and/or type of wired and/or wireless links as well as other network infrastructure components that are not shown in FIG. 1 for purposes of brevity. The link 109 may represent additional cellular network towers (such as one or more base stations, eNode Bs, relays, macrocells, femtocells, etc.). The network infrastructure may further include a network domain 106, which may be implemented as any suitable type of domain that acts as a bridge between the computing device 108 and the various AMRs 102 via the access points (APs) 104.1, 104.2.

The APs 104 may be implemented as any suitable number and/or type of AP configured to facilitate communications in accordance with any suitable type of communication protocols. The network domain 106 may be implemented as a time-sensitive network (TSN) domain or any other suitable network domain that is connected to the computing device 108 via the link 107, which may be an Ethernet-based network and link. The APs 104 may, in accordance with such implementations, be implemented as wireless TSN (WTSN) access points that form a TSN network together with the network domain 106 that is synchronized to an accurate clock source. The network infrastructure may include any suitable number of APs 104, with two being shown in FIG. 1 for purposes of brevity. As shown FIG. 1, the APs 104.1, 104.2 service the AMRs 102 to facilitate wireless communications between the AMRs 102 and the computing device 108 (or other suitable network infrastructure component such as the cloud server(s) 110).

Thus, the APs 104 may be configured to support communications in accordance with any suitable number and/or type of communication protocols, such as an Institute of Electrical and Electronics Engineers (IEEE) 802.11 Working Group Standards, the most recent version at the time of this writing being IEEE Std 802.11™-2020, published Feb. 26, 2021 and/or the IEEE 802.11 TSN networking group protocols, the most recent version of which at the time of this writing being the IEEE Std 802.1AS-2020: IEEE Standard for Local and Metropolitan Area Networks—Timing and Synchronization for Time-Sensitive Applications, published Jun. 19, 2020. Such TSN standard protocols may allow TSN capabilities to be mapped from Ethernet to Wi-Fi without architecture changes or protocol translation gateways. Alternatively, the APs 104 may operate in accordance with other types of communication standards other than the 802.11 Working Group, such as cellular based standards (e.g. "private cellular networks") or other local wireless network systems. In still other alternative aspects, the AMRs 102 may communicate directly with the computing device 108 or other suitable components of the network infrastructure (or other suitable network infrastructure component such as the cloud server(s) 110) without the need to use the APs 104.

In any event, the AMRs 102 may communicate with the computing device 108 (or other suitable network infrastructure component such as the cloud server(s) 110) to realize the various techniques and implementations as described herein. Thus, the network infrastructure may include any suitable number and combination of wired and/or wireless devices and accompanying links. In the environment 100 as shown in FIG. 1, the links 105.1, 105.2, 107, and 109 are solid lines and thus represent wired connections, whereas the links 101.1, 101.2, 101.3 are illustrated with broken lines and thus represent wireless connections.

In the environment 100 as shown in FIG. 1, the computing device 108, which again may be implemented as an Edge computing device, server, node, etc., is configured to communicate with each of the AMRs 102 to receive data from the AMRs 102 and to transmit data to the AMRs 102. This functionality may be additionally or alternatively be performed by other network infrastructure components that are capable of communicating directly or indirectly with the AMRs 102, such as the one or more cloud server(s) 110. However, the local nature of the computing device 108 may provide additional advantages in that the communication between the computing device 108 and the AMRs 102 may occur with reduced network latency.

The computing device 108 may thus receive state-related information from each for the AMRs 102 via the APs 104, which may include sensor data acquired via the AMRs such as images, data related to the operating state of the AMRs 102, or any other suitable feedback related to the state of the AMRs or the environment 100 in which the AMR is currently positioned or traversing. The environment 100 may also include any suitable number of environment monitoring devices 103, with two being shown in FIG. 1 for ease of explanation and not by way of limitation. The environmental monitoring devices 103.1, 103.2 may be implemented as any suitable type of components configured to monitor the state of the environment 100 and/or the AMRs 102 that operate within the environment 100. Although not shown in the Figures for purpose of brevity, the environmental monitoring devices 103.1, 103.2 may be configured to communicate with any of the components within the environment 100, and may communicate with the computing device 108 (or other suitable network infrastructure component such as the cloud server(s) 110) via any suitable number and/or type of wired and/or wireless links, as discussed herein with respect to the AMRs 102. Thus, the environmental monitoring devices 103.1, 103.2 may include image sensors, proximity sensors, cameras, etc., that may transmit images of the AMRs 102 or other components of the environment 100 as additional or alternate state-related information. In any event, the computing device 108 may optionally use this state-related information, together with other information about the environment 100 that is already known (e.g. data regarding the size and location of static objects in the environment 100), for task allocation and/or enhanced path planning purposes as further discussed herein.

As further discussed herein, the environment 100 may be digitally represented, stored, and/or otherwise accessed by the computing device 108 as a shared environment model, which includes a navigation grid having cells of any suitable size and/or shape, with each cell having specific properties with respect to the type of object contained (or not contained) in the cell, whether an object in the cell is static or moving, etc., which enables the environment model to accurately depict the nature of the environment 100. As an example, grid cells may be squares of predetermined sizes (such as 80 mm) based upon a desired granularity for a particular environment and accompanying application. The environment model may thus be dynamically updated by the AMRs 102 directly and/or via the computing device 108 on a cell-by-cell basis as new sensor data is received from the AMRs 102 and/or the environment monitoring devices 103. The updates to the shared environment model thus reflect any recent changes in the environment 100 such as the position and orientation of each of the AMRs 102 and other obstacles that may change in a dynamic manner within the environment 100 (e.g. people, forklifts, machinery, etc.).

The computing device 108 executes a path planning algorithm, as further discussed herein, using the shared environment model at a particular time (such as the most recently constructed) to calculate navigational paths for each AMR 102. These navigational paths include sets of intermediate points or "waypoints" that define an AMR trajectory within the environment 100 between a starting point (such as the AMR's current location in the environment 100) to a destination within the environment 100. That is, the waypoints indicate to the AMRs 102 how to execute a planned navigational path to proceed to each of the intermediate points at a specific time until a destination is reached.

Thus, navigation applications implemented by the AMRs 102, as well as other functions, are dependent on the wireless network connectivity. Thus, and as further discussed below, the techniques further provide enhancing path-planning algorithms, among other improvements, in addition to task allocation techniques. The enhanced path-planning enables the calculation of network-efficient and low-congestion navigational paths for the AMRs 102 to thus improve the overall efficiency of navigation tasks performed within the environment 100.

AMR Task Allocation and Operational Flow within an Environment

Figure 2:
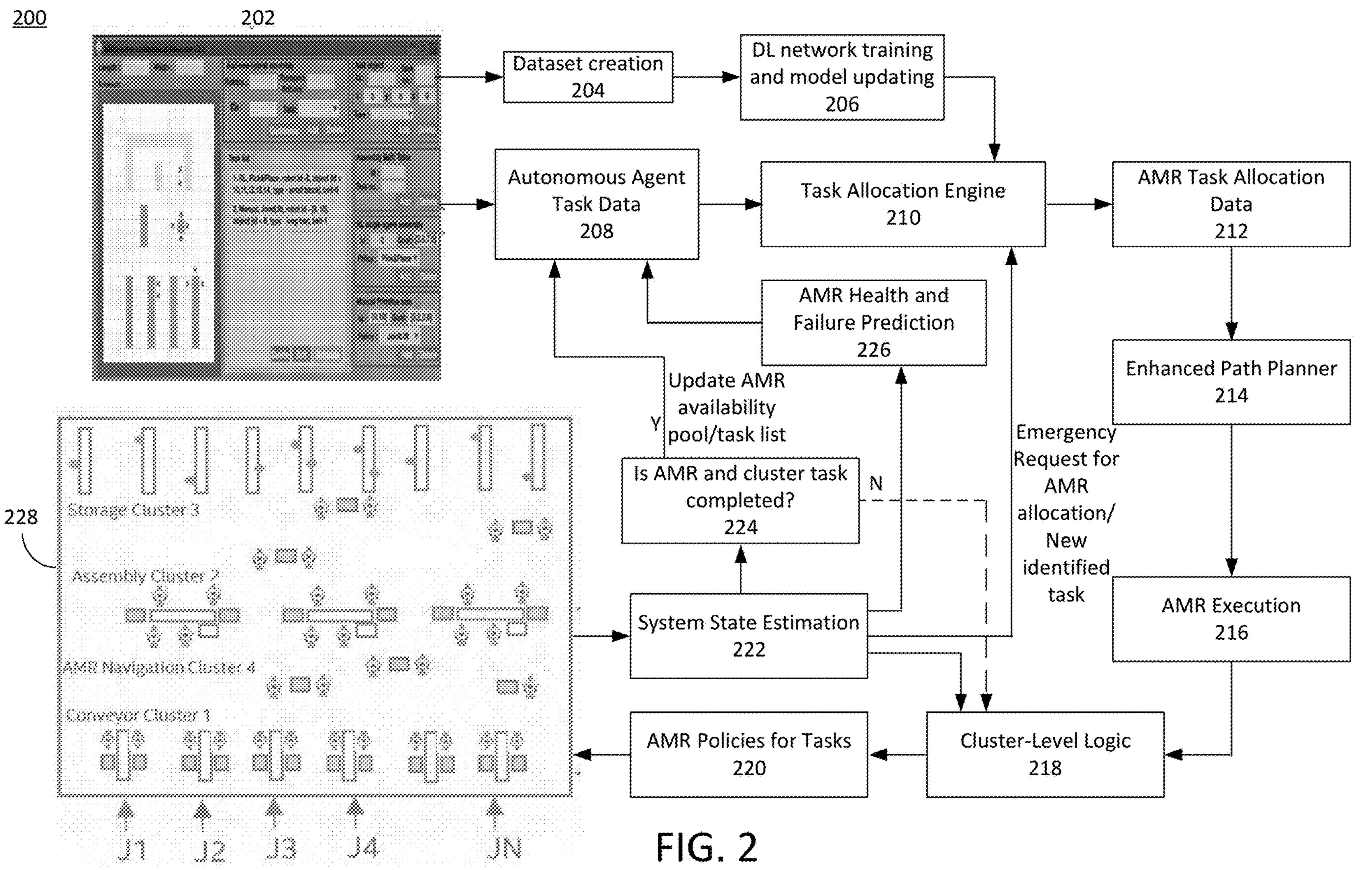
FIG. 2 illustrates a block diagram of a multi-robot multi-task allocation (MRTA) system, in accordance with the disclosure.

FIG. 2 illustrates a block diagram of an overview of a multi-robot, multi-task allocation (MRTA) system, in accordance with the disclosure. The MRTA system 200 may include various stages, or blocks, which perform the functions as described herein. In some instances, which are described in further detail below, the functions performed by the respective blocks may be implemented via any suitable type of processing circuitry or other suitable components. The functionality assigned to the functional blocks of the MRTA system 2090 as discussed herein is provided for ease of explanation and is non-limiting, as these functions may be shared among the functional blocks or performed by different or alternative blocks not shown in the Figures. The processing circuitry of the MRTA system 200 may be identified with the computing device 108 as discussed herein, or other suitable processing devices that may operate as part of the underlying infrastructure of the environment 100, or as remote and/or separate processing components that communicate with the infrastructure (cloud-based servers and/or computers), such that the functional aspects of the MRTA system 200 may be implemented.

Regardless of the particular implementation, the functional aspects of the MRTA system 200 may be performed via execution of machine-readable code, applications, algorithms, instructions, etc., via the processing circuitry of any suitable components of the implemented computing device. Thus, the functional aspects of the blocks as discussed herein with reference to FIG. 2 may be executed as algorithms or other suitable automated processes. Alternatively, and as further discussed herein, the functions of some of the blocks of the MRTA system 200 represent actions that occur as part of the operation of the MRTA system 200 and are provided for purposes of clarity, but may not necessarily be executed by the same computing device as noted above. That is, some of the functional blocks of the MRTA system 200 represent functions identified with a computing device executing machine-readable instructions, whereas other functional blocks may represent the actions of AMRs or other activities that may occur as part of the operational flow of the MRTA system 200.

As shown in FIG. 2, the MRTA system 200 includes a graphical user interface (GUI) 202, which may be displayed via any suitable component of the environment 100 as noted above with reference to FIG. 1, such as the computing device 108. A user may interact with the GUI 202 to provide the appropriate specifications for the environment 100 so that the task allocation engine block 210 may perform AMR task allocation functions. Thus, the use of the GUI 202 may be considered as part of an initial setup step, or used when the environment 100 changes significantly to provide additional information regarding tasks, AMRs 102, the environment 100, etc., as further discussed herein. The GUI 202 may also provide users with information of the environment 100, such as the status of AMRs, their current tasks, or other information obtained from the state-related information as noted herein. Thus, the GUI 202 may serve as both a means for which a user may provide data regarding the environment 100 as well as a means by which to monitor the environment 100.

The GUI 202 may be implemented to generate the basis of the training data that is used to train the task allocation engine block 210, as well as the data related to the AMRs 102, the environment 100, and the nature of the tasks that are to be allocated to the AMRs 102. A user may thus provide, as input to the GUI, any suitable type of information related to these functions as further discussed herein such as an overall task list and the task parameters identified with such tasks.

The data entered via the GUI 202 for task allocation may include what is referred to herein as "autonomous agent task data," and which may represent any suitable type of information related to the tasks to be allocated to the AMRs within the environment 100 and/or other suitable information regarding the AMRs 102, the environment 100, etc. Thus, the autonomous agent task data may include a set of defined tasks to be performed in the environment 100, as well as a set of task parameters associated with each of these tasks. In this way, the autonomous agent task data may define which tasks are potentially to be performed by the AMRs 102 within the environment 100 (i.e. the set of tasks), and details regarding the requirements with respect to how each of these tasks should be executed (i.e. the task parameters).

The set of tasks may be of any suitable number and/or type depending upon the particular application, the capabilities of the AMRs 102, and the environment 100. The tasks may include any suitable type of job to be performed by an AMR 102 such as picking up, manipulating, and/or placing objects on or off a particular location such as a conveyor belt. The tasks may further include moving to a specific destination, carrying objects to specific locations, and/or performing a specific function at a particular location such as executing a repair, recharging, etc. Thus, each one of the set of tasks may be identified with a set of task parameters, which may include any suitable number and/or type of information to define the details regarding how the task is to be performed and/or specific metrics identified with the task to be performed. Thus, the task parameters may include a weight of an object that is moved and/or manipulated, the speed of a conveyor belt transporting the object, robotic manipulation parameters such as pose trajectories, grasping parameters, etc., the duration of the task, the order of the task in production or as part of an assembly line, deadlines for the task to be performed, etc.

The autonomous agent task data may be user-generated or autonomously generated via feedback received and/or monitoring of the MRTA system 200. Thus, the autonomous agent task data may additionally or alternatively include AMR availability data and/or AMR state estimation data. The AMR availability data may identify which of the AMRs 102 within the environment are currently available for task allocation via the task allocation engine block 210, and thus represent an AMR allocation pool. The AMR availability data may be user-generated via the GUI 202 if an AMR 102 is known to be in repairs or decommissioned. Additionally or alternatively, the AMR availability data may be obtained via feedback received from the AMRs 102 as tasks are completed, which is represented in FIG. 2 in AMR and cluster task completion logic block 224 and further discussed below.

The AMR state estimation data may represent part of the autonomous agent task data that identifies various metrics related to the health of the AMRs 102 and/or a probability of a task, if allocated to a particular AMR 102, of being successfully executed. The AMR state estimation data is calculated via the AMR health and failure prediction block 226, which is discussed further detail below.

In any event, the autonomous agent task data, which may include any combination of the aforementioned data types, may be stored locally or otherwise accessed by the computing device that is executing the various functions of the MRTA system 200. The storage of this data is represented in FIG. 2 as the autonomous agent task data block 208.

The task allocation engine block 210 represents the execution of (such as via the computing device 108) a MRTA algorithm that functions to allocate AMRs 102 to specific tasks within the set of tasks included as part of the autonomous agent task data as noted above. The task allocation engine block 210 may be implemented as the execution of any suitable number and/or type of algorithms. The task allocation engine block 210 may comprise any suitable type of neural network for AMR allocation, such as a deep-learning (DL) neural network, reinforcement learning, K-means, support vector machine classifiers, etc. The task allocation engine block 210 may optionally include additional logic to support AMR allocation for urgent and/or unexpected scenarios such as AMR malfunctions, low battery, etc., as further discussed below with respect to the system state estimation block 222.

Figure 3:
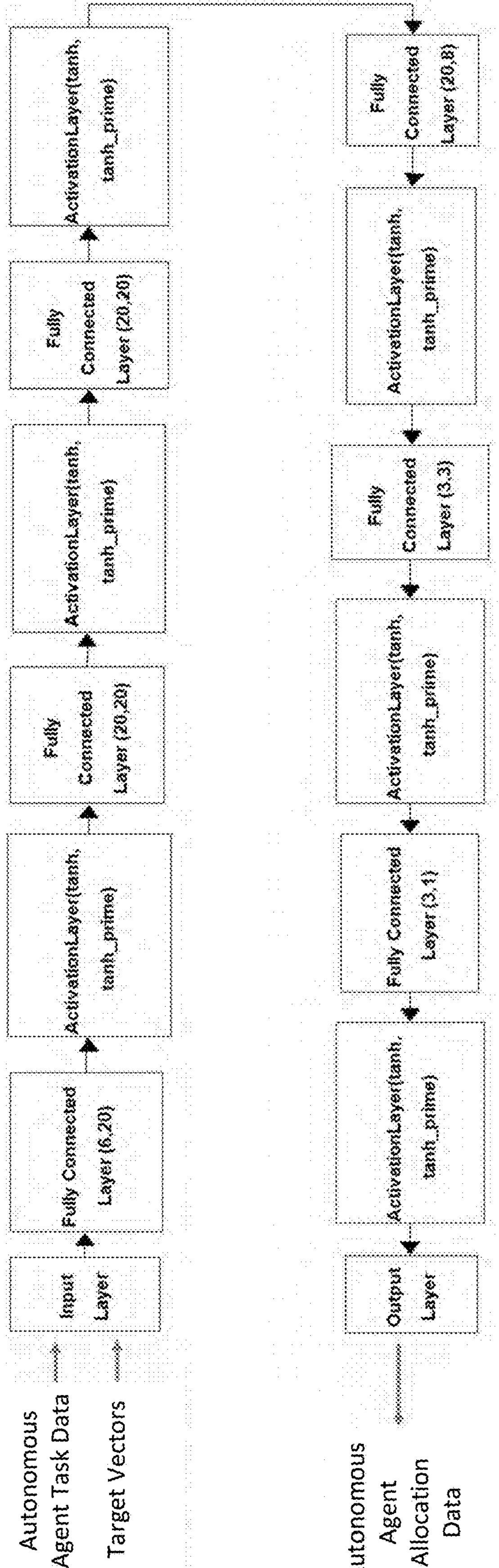
FIG. 3 illustrates a deep learning (DL) neural network architecture, in accordance with the disclosure.

FIG. 3 illustrates a deep learning (DL) neural network architecture, in accordance with the disclosure. The DL neural network architecture 300 may be implemented via the task allocation engine block 210, and is shown in FIG. 3 is a non-limiting scenario. The task allocation engine block 210 may implement any suitable type of neural network architecture to perform AMR task allocation. The DL neural network architecture 300 as shown in FIG. 3 implements a 15-layer network, with 7 fully connected layers, 7 activation layers, and an output layer. In this implementation, Tanh is the activation function used in the network. The number of layers, type of layers, and activation functions implemented by the DL neural network architecture 300 is shown in FIG. 3 as a non-limiting scenario, and the task allocation engine block 210 may implement any suitable number and/or type of neural network architecture and accompanying activation function(s).

Regardless of the implementation of the task allocation engine block 210, the DL neural network architecture 300 may receive inputs related to the aforementioned autonomous agent task data, which may include the set of tasks to be performed, the task parameters identified with each one of the set of tasks, the AMR availability data, the AMR state estimation data, etc. As further discussed below, the DL neural network architecture also receives, as input, target vectors that identify preferred AMR and task pairings. Thus, the DL neural network architecture 300, once trained using a training dataset of similar types of data, functions to perform AMR task allocation based upon the data received at the inputs, i.e. by applying the trained DL neural network to the inputs. Thus, the trained DL neural network architecture 300 implemented via the DL neural network architecture 300 may dynamically and intelligently allocate AMRs 102 to specific tasks as conditions in the environment 100 change, as AMRs 102 complete other tasks, as AMRs 102 are identified as malfunctioning, as new tasks are identified, etc. In other words, the task allocation engine block 210 implements the DL neural network architecture 300 to output (i.e. generate at the output layer) AMR task allocation data at AMR task allocation data block 212 using the autonomous agent task data and target vectors received via the input layer(s). The target vectors received via the input layer(s) may include all target vector values or a subset thereof. In any event, the task allocation engine block 210 is trained to determine AMR allocation based on the received target vector values, as discussed herein. The AMR task allocation data may be stored locally or otherwise accessed by the computing device that is executing the various functions of the MRTA system 200. The storage of this data is represented in FIG. 2 as the AMR task allocation data block 212, which represents autonomous agent task allocation data that allocates one or more of the AMRs 102 to a corresponding task from the aforementioned set of tasks.

To do so, the DL neural network architecture 300 implemented by the task allocation engine block 210 may be trained using a training dataset. The training dataset may be generated manually or via a separate algorithm for this purpose, which may be executed via the computing device that is executing the various functions of the MRTA system 200 or a separate computing device. In any event, the dataset creation block 204 may be identified with the generation and storage of the training dataset. Thus, the training dataset may be stored locally or otherwise accessed by the computing device that is executing the various functions of the MRTA system 200.

The training dataset may be generated manually, which may be feasible when the number of input variables are few in number. However, to create a training dataset manually is not only time-consuming, but also infeasible in situations where there are a large number of parameters used to determine the allocation of an AMR 102 to a particular task. In a multi-robot environment such as a warehouse or a factory, as a practical matter several parameters need to be considered to ensure a proper AMR task allocation, which may include the aforementioned set of task parameters, the priority and the urgency of a task, as well as cost parameters such as AMR distance to a specific task location, AMR battery life, distance and time required to navigate to a destination (such as a recharging station), etc. Thus, the training dataset may be generated algorithmically using what is referred to herein as a "target vector" technique.

To generate the training dataset in an algorithmic manner, a generalized model is implemented that estimates high-level parameters of tasks such as task priority, cost, and reward value, and then combines these parameters to determine which AMR is best suited for a particular task. This output, which represents a pairing of an AMR 102 to a particular task based upon an analysis of the resulting reward metrics for each of the AMRs 102 for that same task, is referred to herein as a "target vector." The target vector may thus be determined from the reward metrics for each task to be allocated by identifying the AMR 102 that, if allocated to perform that task in accordance with the task parameters, yields the highest reward metric value. A flow of the algorithm used to calculate the target vector is this manner is illustrated in further detail in FIG. 4 and discussed below.

Figure 4:
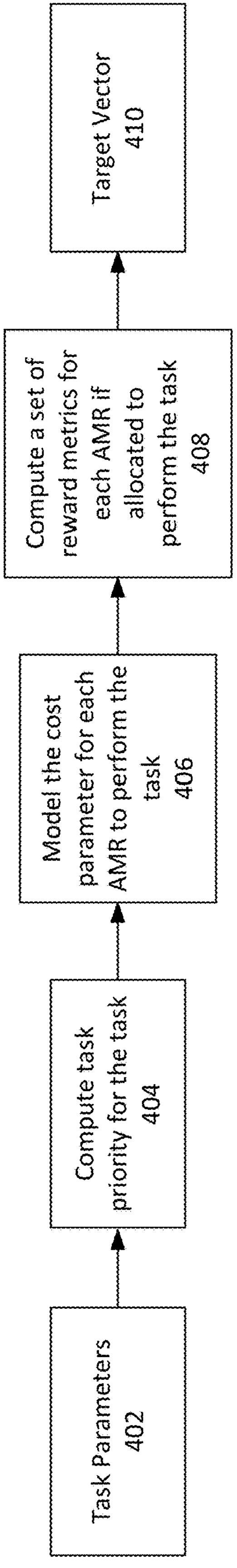
FIG. 4 illustrates a block diagram of a process flow calculate target vectors as part of a training dataset, in accordance with the disclosure.

As shown in FIG. 4, the dataset creation algorithm receives as inputs a set of task parameters identified with one of the set of tasks (block 402). The output of the dataset generation algorithm (block 410) results in a pairing of an AMR 102 with the current task, i.e. the allocation of a specific AMR 102 to the current task. The target vector thus represents data that identifies the AMR 102 allocated to a particular task based upon the specific task parameters, which may include a unique identifier for the AMR 102 (i.e. a robot ID) and the allocated task (i.e. a task ID). The target vector is calculated in this manner from a set of reward metrics as discussed in further detail below, which are calculated via the intermediate blocks 404, 406, and 408.

The flow 400 of the dataset creation algorithm as shown in FIG. 4 includes prioritizing a task based upon a weighted sum of the task parameters for that task. In this way, a user may define which tasks are to be prioritized over others based upon various factors. Thus, the intermediate block 404 includes the calculation of a task priority parameter for a respective task based upon a weighted sum of a set of defined task parameters for that particular task. The task priority parameter may be calculated in this manner in accordance with Equation 1 below, which represents a non-limiting scenario.

$$\text{Task Priority Parameter} = W_1X_1 + W_2X_2 + W_3X_3 + \ldots + W_NX_N, \quad \text{Eqn. 1}$$

Where $X_1$ to $X_N$ represent any suitable number N of input task parameters for the task. The task parameters may include any suitable type of parameters that may be defined among the set of tasks to differentiate prioritization. In some scenarios, non-limiting task parameters include the weight of an object, the speed of a conveyor belt transporting the object, robotic manipulation parameters such as trajectory and/or pose, a duration of the task, an order of the task in production or on an assembly line, a task deadline, etc. Moreover, $W_1$ to $W_N$ represent respective weights applied to each of the task parameters X to derive a corresponding task priority parameter. An illustrative scenario of applying weights in a non-limiting manner to derive a task priority parameter is illustrated below.

$$\text{Task Priority Parameter} = W_1(\text{speed of conveyor belt}) + W_2(\text{weight of object}) + W_3(\text{level}) + W_4(\text{task duration})$$

The level task parameter as noted above may be user-defined based on the type of operations, the workflow required, etc. In the scenario as shown above, illustrative weights may be selected as weight $W_1$ of 3 for the speed of the conveyor belt, a weight $W_2$ of 5 for the weight of the object, a weight $W_3$ of 1 for the task level, and a weight $W_4$ of 1 for the task duration. Again, the task parameters and the accompanying weights used to calculate the task priority parameter discussed herein are provided in a non-limiting sense, and may be changed as per the task requirements.

The flow 400 of the dataset creation algorithm as shown in FIG. 4 includes modeling a cost parameter based upon a weighted sum of a set of cost factors for each AMR 102 to perform the task if allocated to do so. Each one of the set of cost factors may represent a different state of a particular AMR 102 in the event that that AMR 102 is allocated to the task for which the task priority parameter was calculated. Thus, the intermediate block 406 includes the calculation of a cost parameter for each AMR 102 that could potentially be allocated to perform the task, which again is based upon a weighted sum of a set of defined task parameters for that particular task for which the task priority parameter was calculated. The cost parameter may be calculated in this manner for each AMR 102 in accordance with Equation 2 below, which represents a non-limiting scenario.

$$\text{Cost Parameter} = A_1P_1 + A_2P_2 + A_3P_3 + \ldots + A_MP_M, \qquad \text{Eqn. 2}$$

Where $P_1$ to $P_M$ represent any suitable number M of cost factors associated with allocating an AMR 102 to a particular task. The cost factors may include any suitable type of AMR state, environmental state, etc., which may be considered to impact the preference of and/or ability for an AMR 102 to complete a task if allocated to do so. In some non-limiting scenarios, the cost factors may include a distance between a current position of the AMR 102 to the task location, the current AMR 102's battery life, the required energy consumption to perform the task, a distance to a recharging station, etc. Moreover, $A_1$ to $A_N$ represent respective weights applied to each of the cost factors P to derive a corresponding cost parameter. An illustrative scenario of applying weights in a non-limiting manner to derive a cost parameter is illustrated below using a single cost factor for ease of explanation. However, this is a non-limiting illustration, and the cost parameter may be calculated for each AMR 102 using any suitable number and/or type of cost factors and accompanying weights.

In a non-limiting illustration of the calculation of the cost parameter for each AMR for a specific task, a model is implemented using a single cost factor representing the distance from a specific AMR 102 to a task location, with a corresponding weight of 1. The distance to the task location may be calculated in any suitable manner, including known techniques to do so. In one illustrative and non-limiting scenario, the distance may be calculated using the known "A*" algorithm.

The flow 400 of the dataset creation algorithm as shown in FIG. 4 includes calculating a defined joint parameter, which is referred to herein as a "reward parameter," "reward metric," or "reward value" (intermediate block 408). The reward metric represents a further weighted sum of the task priority parameter and the cost parameter. In other words, further weights may be selected to prioritize between the task priority parameter and the cost parameter when determining which AMR 102 is "best" to be allocated to a specific task. The reward metric may be calculated in this manner for each AMR 102 in accordance with Equation 3 below, which represents a non-limiting scenario.

$$\text{Reward Metric} = B_1(\text{Task Priority Parameter}) + B_2(\text{Cost Parameter}), \qquad \text{Eqn. 3}$$

where $B_1$ to $B_2$ represent weights applied to the task priority parameter and the cost parameter, respectively, to derive a corresponding reward metric. The reward metric thus functions as a single effective metric for allocating each AMR 102 to a particular task. The weights may be selected between any suitable range of values based upon the particular application, test results, etc. In one non-limiting scenario, $B_1=2$ and $B_2=-1.5$. In other words, the reward metric may be calculated based upon a combination of the task priority parameter, which represents a weighted sum of the set of task parameters for a particular task, and a cost parameter, which represents a weighted sum of a set of cost factors for each AMR to perform that task. The dataset creation algorithm thus functions to generate a set of reward metrics, one for each AMR 102, to perform a given task if the task is allocated to each of the AMRs 102.

Once the set of reward metrics are calculated for each AMR 102 for a specific task as noted above, the target vector is calculated by selecting, for each task to be allocated, the AMR having the highest value of the reward metric calculated for that particular task. Thus, the target vector represents a specific combination of a robot ID and a task ID for a particular task given the weighted task parameters and weighted cost factors. This process may then be repeated for any suitable number of tasks with any suitable number of task parameters, task priority weights, cost factor weights, and/or reward metric weights being varied, such that the training dataset represents an adequately large pool of training data that is used to train the DL neural network architecture 300. Thus, to generate the training dataset, a respective set of reward metrics are generated for any suitable number of the set of tasks and accompanying task parameters to yield respective target vectors, with each set of reward metrics corresponding to a particular task in accordance with the task parameters specified for that task.

As an illustrative and non-limiting scenario, a training dataset may be generated for a warehouse environment which consists of mainly 3 types of tasks that operate sequentially. These three tasks include:

1. Handling of objects in a conveyer belt station;
2. Sorting and palletization of objects at a multi-robot packing station; and
3. Storage of pallets in shelves.

For the conveyor belt tasks in this warehouse environment, the following task parameters and accompanying weights are implemented as shown in Table 1 below.

TABLE 1

| Parameter | Range | Weight Assigned |
|---|---|---|
| Speed of conveyor Belt | (2, 6) | 3 |
| Weight of the object | (1, 4, 8) | 5 |
| Task Level | (2, 4, 6) | 1 |
| Time of execution | (1, 2) | 1 |

Continuing this illustrative scenario, a cost function model is implemented that calculates the cost parameter using a single cost factor corresponding to an AMR 102 moving from its current position to the desired task location (i.e. from the robot station to a conveyor belt task location), and which may utilize a weight of 1 or other suitable value. Tables 2A and 2B below summarize the respective sets of reward metrics for two different sample tasks using the task parameters as shown in Table 1. The AMRs 102 allocated to a particular task is based on the highest reward metric that is computed from among the set of reward metrics for each respective task. The target vector (in bold in each of the Tables 2A and 2B) thus represents a robot ID and task ID for that particular task. With Tables 2A and 2B in mind, it is noted that the disclosure often refers to sets of tasks or different tasks, although tasks may be considered "different" based upon task type or, alternatively, for the same type of task (such as conveyor belt movement as shown in the present scenario) but defined in accordance with different task parameters.

TABLE 2A

| Task 1 (Task ID 1) | | | |
|---|---|---|---|
| AMR 102 Identifier | Task Priority Parameter | Cost Parameter | Reward Metric |
| 0 | 28 | 22 | 23 |
| 1 | 28 | 21 | 24.5 |
| 2 | 28 | 2 | 53 |
| 3 | 28 | 13 | 36.5 |
| 4 | 28 | 21 | 24.5 |
| 5 | 28 | 22 | 23 |
| 6 | 28 | 14 | 35 |
| 7 | 28 | 4 | 50 |
| 8 | 28 | 22 | 23 |
| 9 | 28 | 25 | 18.5 |
| 10 | 28 | 20 | 26 |
| 11 | 28 | 21 | 24.5 |
| 12 | 28 | 20 | 26 |
| 13 | 28 | 18 | 29 |
| 14 | 28 | 20 | 26 |

TABLE 2B

| Task 2 (Task ID 2) | | | |
|---|---|---|---|
| AMR 102 Identifier | Task Priority Parameter | Cost Parameter | Reward Metric |
| 0 | 16 | 21 | 0.5 |
| 1 | 16 | 21 | 0.5 |
| 2 | 16 | 6 | 23 |
| 3 | 16 | 18 | 5 |
| 4 | 16 | 16 | 8 |
| 5 | 16 | 21 | 0.5 |
| 6 | 16 | 14 | 11 |
| 7 | 16 | 13 | 12.5 |
| 8 | 16 | 21 | 0.5 |
| 9 | 16 | 20 | 2 |
| 10 | 16 | 24 | −4 |
| 11 | 16 | 21 | 0.5 |
| 12 | 16 | 24 | −4 |
| 13 | 16 | 14 | 11 |
| 14 | 16 | 24 | −4 |

Thus, once the training dataset is created, the MRTA system 200 includes a DL network training and module updating block 206 as shown in FIG. 2. This DL network training and module updating block 206 may represent the execution of online training, offline training, or combinations of these, with respect to DL neural network architecture 300. In the event that online training is implemented, the module updating block 206 may additionally include model updating, which may represent adjustment of the various tasks, task parameters, task priority parameters, task priority parameter weights, cost factors, cost factor weights, reward metric weights, etc. In this way, the MRTA system 200 may adapt the training of the DL neural network architecture 300 based upon new tasks that may be added or new task parameters that may be changed over time such as the addition of new AMRs 102, different task priorities, the availability of different AMRs in the environment 100, the requirement to perform tasks at a higher velocity of operation, higher weight objects, additional stations, etc.

In any event, the DL neural network architecture 300, once trained in this manner as noted above using the generated target vectors, is deployed as part of the task allocation engine block 210. The DL neural network architecture 300 implemented by the task allocation engine block 210 is thus configured to receive autonomous agent task data and one or more target vectors, as shown in FIG. 3, and to output (i.e. calculate) autonomous agent task allocation data in AMR task allocation data block 212. The autonomous agent task data may thus include one or more tasks to be performed, the task parameters identified with those tasks, which may include the AMRs 102 currently available from an availability "pool" (the details of which being further discussed below), scheduled times to complete tasks, robot IDs, task IDs etc. The DL neural network architecture 300 may also receive, as inputs, one or more target vectors that were calculated as noted above with respect to the generation of the training data. Again, the target vectors may identify a pairing of AMRs 102 to specific tasks based upon certain task parameters and the resulting set of reward metrics for that specific task and task parameters. Thus, because the DL neural network architecture 300 is trained using the training dataset that includes the target vectors, the DL neural network architecture 300 is configured to infer an allocation of AMRs 102 to respective tasks. In other words, the DL neural network architecture 300 is trained to match and allocate the best selection of a robot ID (from the available AMRs) to a respective task ID (from among the current list of tasks) for all tasks using the target vector.

Enhanced AMR Path Planning within an Environment

As further discussed below, once AMRs 102 are allocated to specific tasks, the MRTA system 200 further includes an enhanced path planner block 214, which functions to plan the AMR routes from each AMR's current position to the appropriate task location based on environment maps. The enhanced path planner block 214 may thus represent the execution of machine-readable instructions via processing circuitry or other suitable components identified with the computing device 108 (or other components of the environment 100) as discussed herein. The enhanced path planner block 214 may receive or otherwise access the starting location of a respective AMR 102, as well as the location of the allocated task to the AMR 102 via the data included as part of the autonomous agent task allocation data as discussed herein.

Additionally or alternatively, the enhanced path planner block 214 may identify the current location of any one of the AMRs 102 via feedback provided (i.e. data transmitted by) each of the AMRs 102, as noted herein, which may indicate the location of each AMR 102 within the environment 100. Furthermore, the shared environment model as discussed herein may be represented as an arrangement of grid cells of any suitable size/resolution, and the environment model may be accessed at the enhanced path planner block 214 to determine any suitable type of information to provide enhanced path planning as discussed herein. The shared environment model may be alternatively referred to herein as an environment map, which identifies the current location of each AMR 102 within the environment as well as other information regarding the environment 100. In various scenarios, the shared environment model may additionally indicate the location of access points 104, the location of other objects in the environment 100, the signal strength of wireless signals at various grid cells locations in the environment 100, etc. Thus, via information obtained from the AMR 102 onboard sensors and/or the environment monitoring devices 103, the environment model may be dynamically updated as the various conditions of the environment 100 change, as AMRs 102 move to other locations, as objects (i.e. people, equipment, etc.) move within the environment 100, etc.

The enhanced path planner block 214 may leverage any suitable information obtained via the environment model or other suitable sources (such as the AMR 102 onboard sensors and/or the environment monitoring devices 103) to calculate a route for each AMR 102 to follow to perform a respective allocated task. As further discussed in detail below, these routes may be calculated based upon network connectivity in the environment 100 and/or a congestion along the route caused by the presence of objects in the environment 100. Thus, the enhanced path planner block 214 may function to generate a route that indicates waypoints for an AMR 102 to follow to navigate to a location and to perform its allocated task. This process may be repeated by the enhanced path planner block 214 to calculate a route of waypoints for each of the AMRs 102 to perform their respective tasks at various locations as AMRs 102 are dynamically allocated to perform different tasks.

Figure 5A:
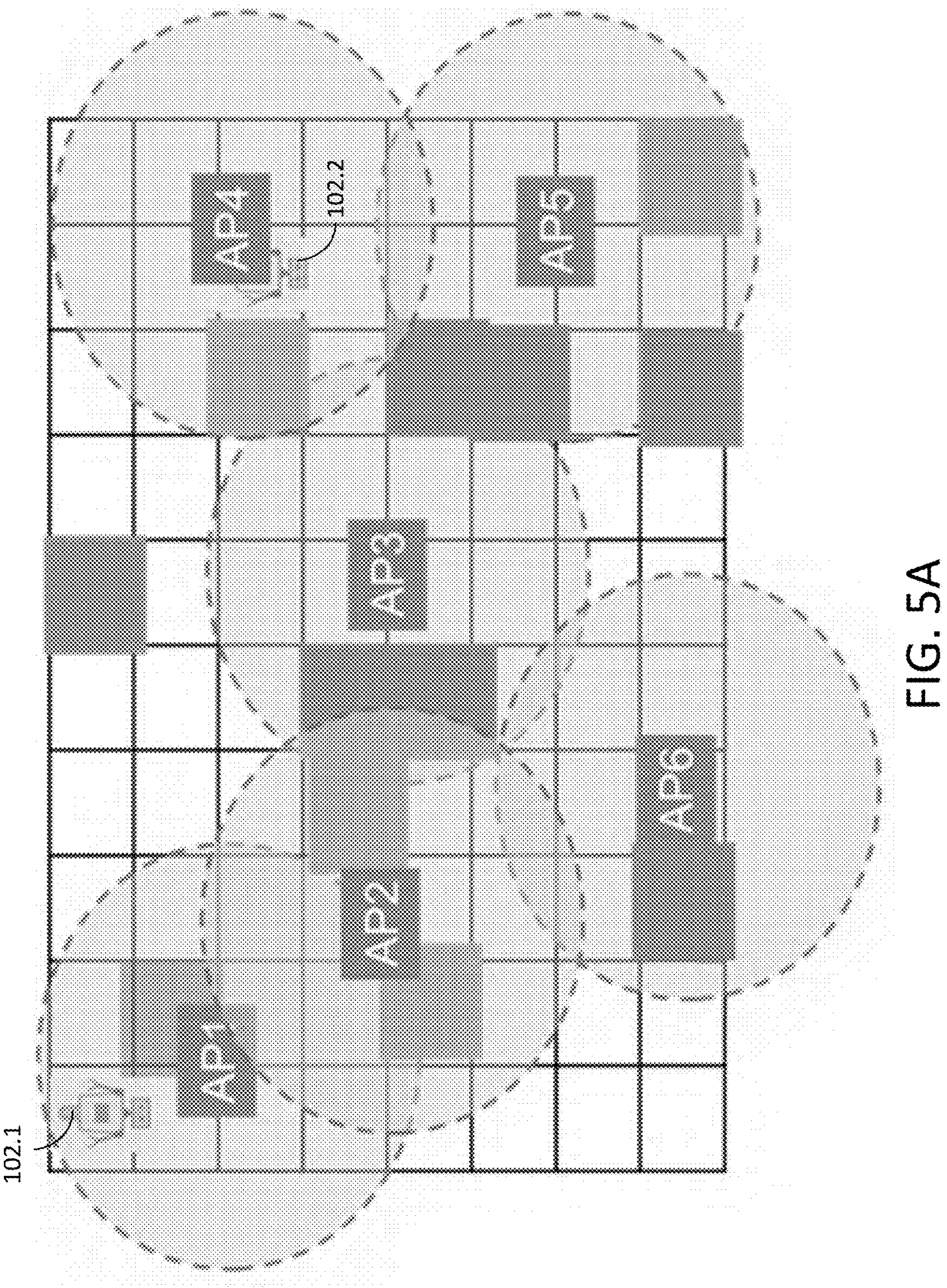
FIGS. 5A-5D illustrate stages of an enhanced path planning process, in accordance with the disclosure.

The route calculated by the enhanced path planner block 214 thus ensures both a high network connectivity as well as a route with the least (or at least reduced) congestion. The steps performed by the enhanced path planner block 214 to calculate a route for a sample AMR 102 are shown in further detail with reference to FIGS. 5A-5E. As an initial step, the enhanced path planner block 214 first computes the network high connectivity contours and overlays these onto the environment model to find regions (and accompanying grid cells) with high connectivity, as shown in FIG. 5A. This may be already known as part of the data included in the environmental model as discussed herein depending upon the implementation of the MRTA system 200. That is, the computing device 108 may periodically command the AMRs 102 and/or the APs 104 to measure wireless communication metrics such as latency (e.g. uplink and/or downlink latencies for the monitored wireless links) receive signal strength indicator (RSSI) values, packet error rate (PER), jitter, bit error rate (BER), signal to noise ratio (SNR), available bandwidth, signal to noise plus interference ratio (SINR), carrier to interference plus noise ratio (CINR), modulation and coding schemes (MCS) histogram data (e.g. Open Systems Interconnection (OSI) model layer 1 (L1) and layer 2 (L2) statistics), etc. It is noted with reference to FIGS. 5A-5D that the APs AP1-AP6 may be identified with the APs 104 as discussed herein with reference to FIG. 1.

The computing device 108 may then aggregate any suitable number and/or type of these metrics over any suitable time period to identify and differentiate portions of the environment 100 with low and high connectivity metrics, and label the grid cells as appropriate. The identification of connectivity for the grid cells of the environment model or map may thus be based upon any suitable number or combination of wireless connectivity metrics, such as those described immediately above, and may use a predetermined threshold value to differentiate "good" versus "bad" connectivity for various grid cells. In one scenario, the RSSI values exceeding a predetermined RSSI value and/or an available bandwidth exceeding a predetermined threshold bandwidth value may be used as metrics to identify grid cells having good connectivity.

Figure 5B:
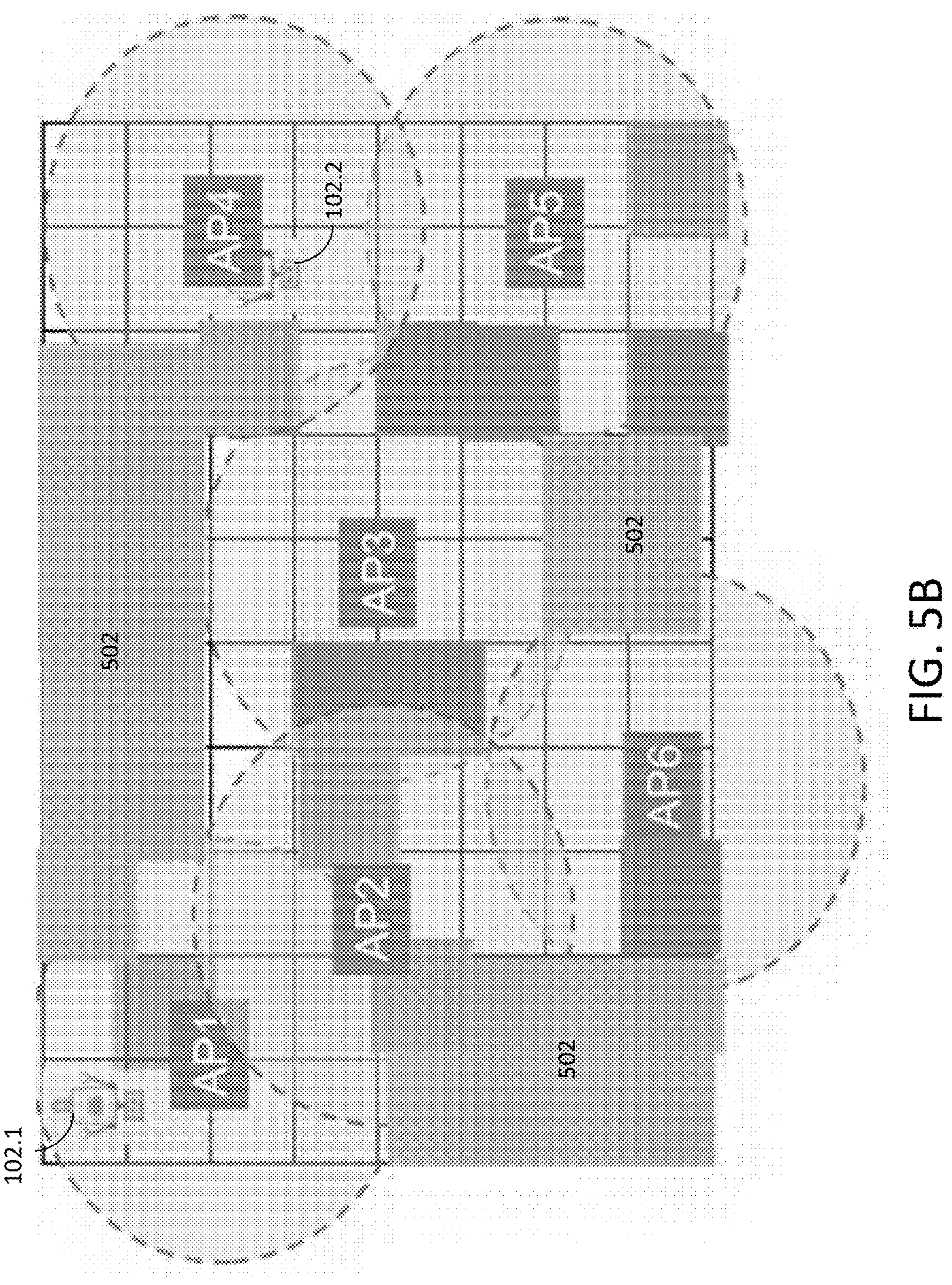

Next, and as shown in FIG. 5B, the enhanced path planner block 214 may eliminate grid cells 502 within the map of the environment having a wireless connectivity metric that is less than a threshold value from qualifying for route planning. The remaining grid cells, i.e. the grid cells available to route an AMR 102 to a target location, may be considered a subset of cells that qualify for route planning. In other words, the subset of cells available for routing of an AMR 102 as shown in FIG. 5B represents only grid cells with a wireless connectivity metric that exceeds a threshold value, and represent the difference between the total available grid cells in the environment 100 and the eliminated grid cells 502. This subset of route-qualifying cells thus defines the grid cells that may be available to route an AMR 102 to a particular location.

Figure 5C:
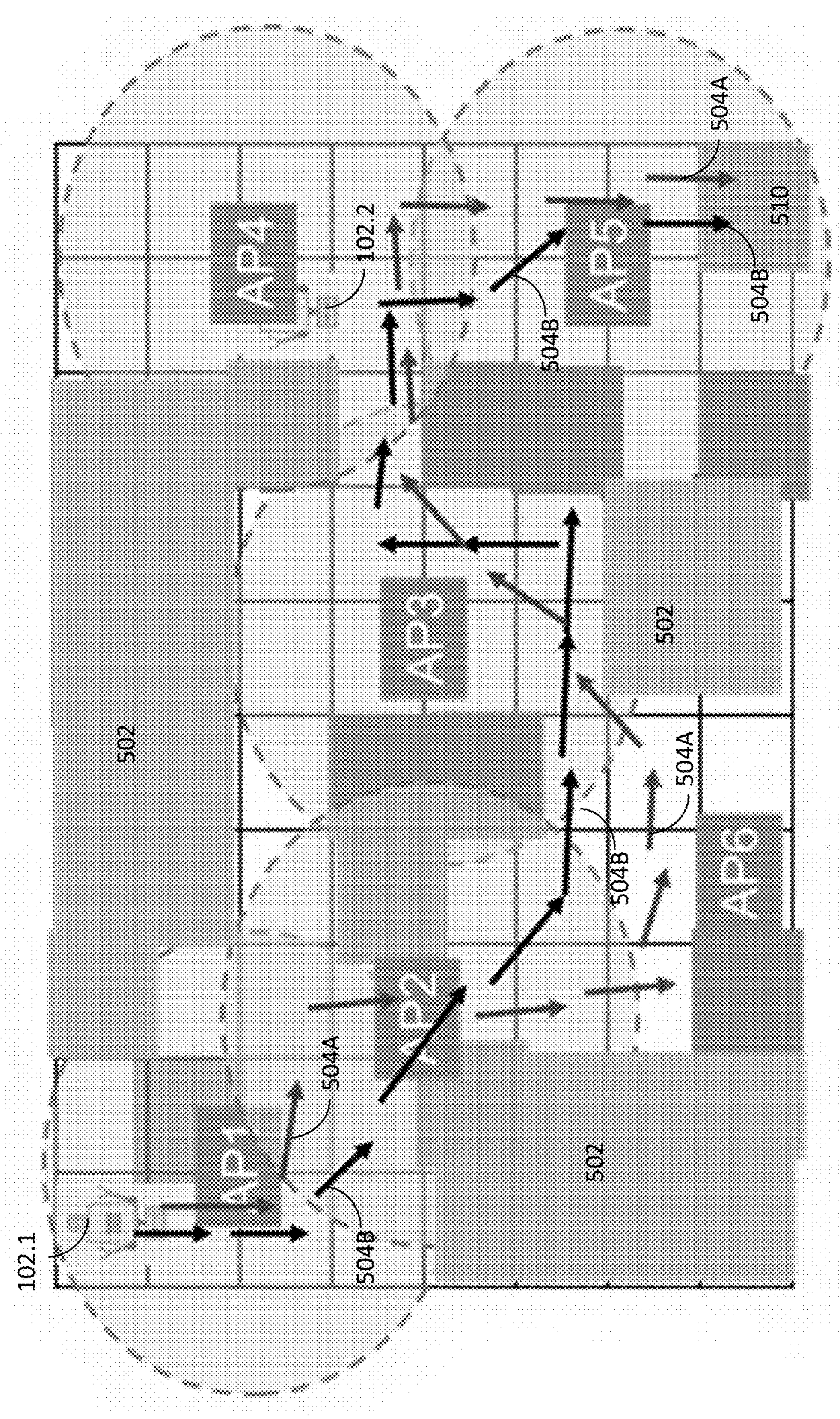

As shown in FIG. 5C, the enhanced path planner block 214 may execute any suitable type of routing algorithms or techniques, including known techniques, to calculate any suitable number of routes for an AMR 102 that are confined to the subset of route-qualifying grid cells as noted above (i.e. excluding the grid cells 502). In one scenario, the known path planning algorithm A* may be implemented for this purpose to plan multiple paths for the AMR 102.1 as shown in FIG. 5C to navigate from a starting location to the target grid cell location 510. In the scenario illustrated in FIG. 5C, two planned paths or routes 504A, 504B are shown, although this is a non-limiting scenario, and any suitable number of routes may be calculated within the subset of route-qualifying cells.

Figure 5D:
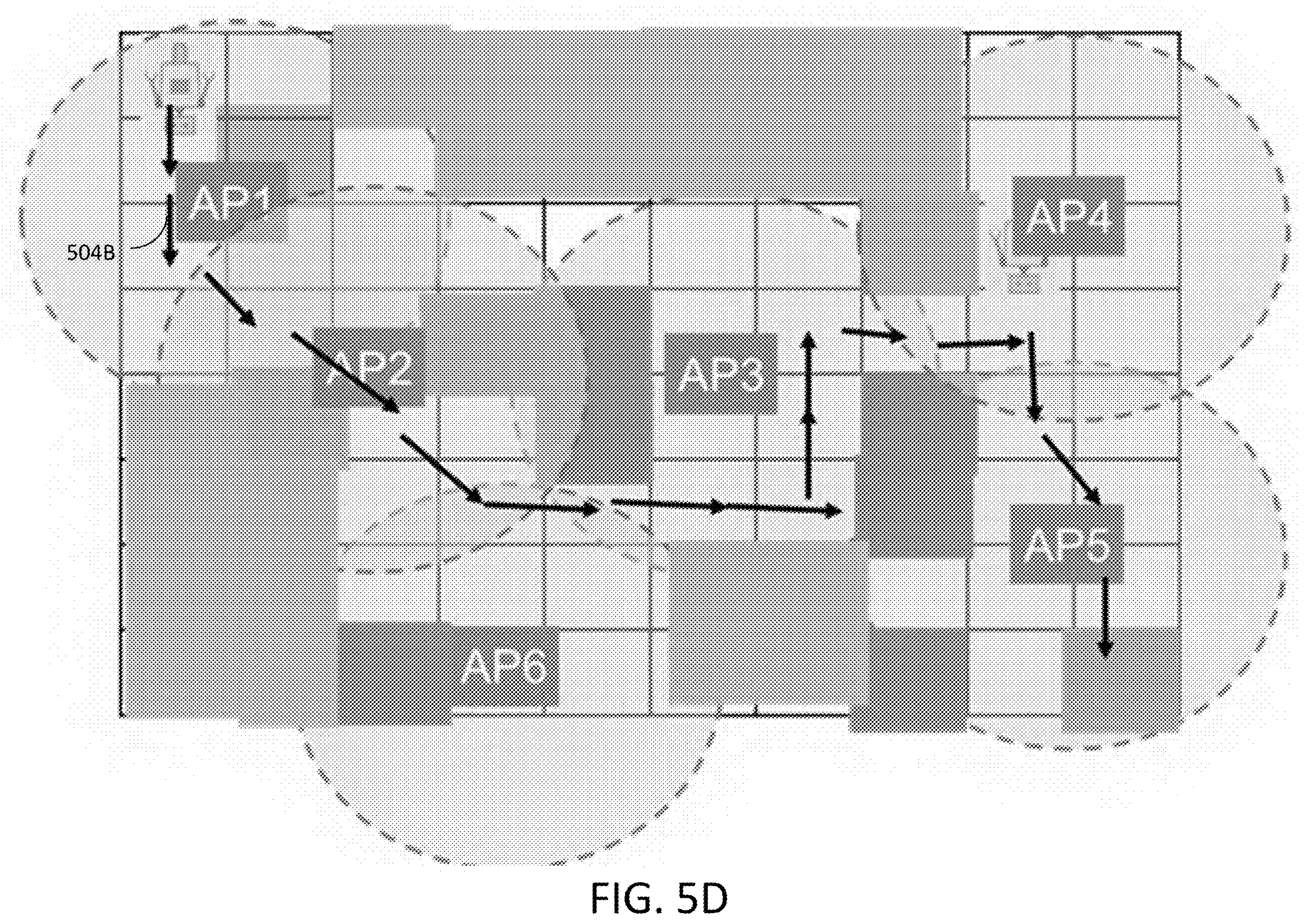
Figure 5E:
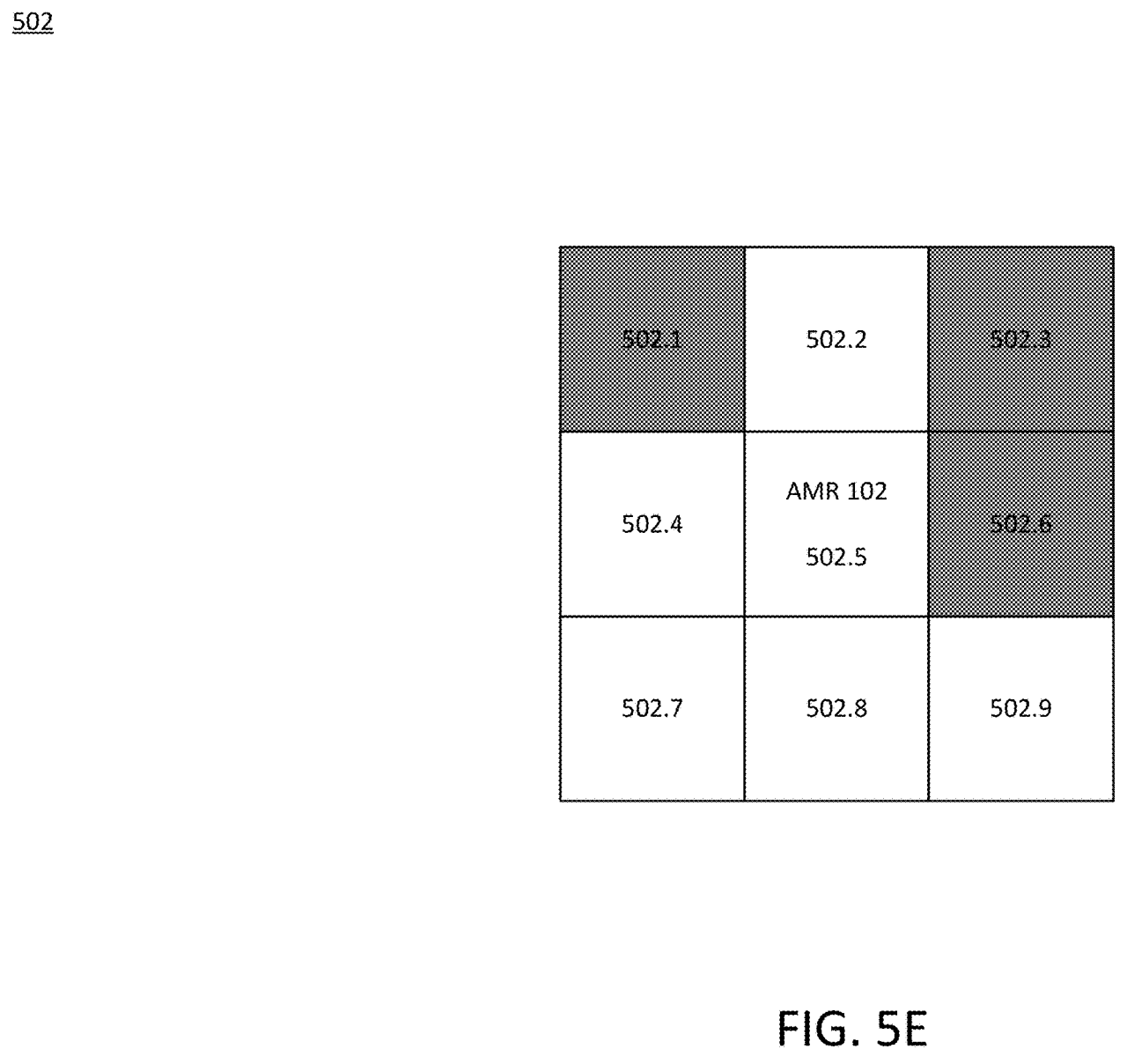

Once the routes are calculated as shown in FIG. 5C, a preferred route is selected based upon a further condition with respect to the congestion along each route. Using this condition, a route may be selected that is less congested (or the least congested among the calculated routes). To do so, a parameter referred to herein as the congestion factor is computed for each route based upon grid cells along each respective route that are occupied by objects. The congestion factor thus provides a measure of the open area of each route and the risk of collisions along that particular route. The route with the lowest corresponding congestion factor is then selected as the best (i.e. least-congested) route for the AMR 102, which is the route 504B as shown in FIG. 5D in this scenario.

The congestion factor may be computed for each route by aggregating and normalizing a calculated congestion parameter of each grid cell that corresponds to that route. That is, in one non-limiting scenario, the congestion parameter is calculated for each route in this way by computing, for each of the cells within a route, a congestion parameter. The congestion parameter is calculated per each grid cell along each route based upon a proportion of a number of adjacent cells occupied by an object to a total number of the cells adjacent to that grid cell. A congestion factor calculation is provided with reference to FIG. 5E, in which the AMR 102.1 is assumed to be located in one cell 502.5 along one of the routes 504A, 504B. The adjacent or neighboring cells include 8 total cells, with 3 of these cells (502.1, 502.3, and 502.6) being occupied (at least partially) by objects. Thus, the congestion factor for the grid cell 502.5 would be $(3/8)=0.375$. This process is then repeated for each grid cell along by aggregating (such as summing) the calculated congestion parameters for each of the cells along the respective route. The congestion factor may be expressed as the total aggregation of congestion parameters along a route divided by the total number of cells along that route.

AMR Health and Failure Prediction

As discussed herein, the task allocation engine block 210 may allocate the AMRs 102 to the various tasks in the environment 100 in an autonomous manner, and the enhanced path planner block 214 may then plan routes for the AMRs 102 to take to execute their respective tasks. The AMRs 102, once allotted to specific tasks and a route to take to complete those tasks, then navigate and/or move to complete their respective tasks, which may include using perception information such as vision-based sensors. The execution of these tasks is thus represented in FIG. 2 as the AMR execution block 216, which may additionally include mapping the AMRs 102 to respective task clusters as further discussed below.

That is, to further enhance the efficiency of the MRTA system 200, the cluster-level logic block 218 is implemented to drive the local AMR 102 allocation decisions at the task cluster-level. The cluster-level logic block 218 thus implements any suitable type of algorithm, logic, code, etc., to monitor the performance of the AMRs 102 during task execution on a cluster-based level, which may define several AMRs 102 that are allocated to perform a type of task. In one scenario as shown in FIG. 2, these task-based clusters may be of any suitable number and/or type depending upon the particular application and the environment 100. Typical task clusters may include conveyor belt task clusters, navigation clusters, assembly clusters, storage clusters, etc. Thus, the cluster-level logic block 218 may function to check the poses of AMRs 102 within the same cluster, monitor AMR task performance of various clusters, identify start/stop and/or emergency task scenarios, function to substitute AMRs within the same cluster with other AMRs 102 when one AMR 102 is underperforming due to various conditions such as collisions/electrical shorting, poor task accuracy, robot arm speed being below normal, etc.

In other words, the task allocation engine block 210 functions to initially allocate the AMRs 102 to specific tasks. However, the cluster-level logic block 218 is configured to function as a secondary AMR task allocator to further verify whether, at the time the task is to be executed by an AMR 102 (i.e. prior to the task being performed by the AMR 102), any conditions are present that would result in a failure of the AMR 102 to perform its allocated task.

As one scenario, the cluster-level logic block 218 may function to ensure all the AMRs 102 in the same cluster are in the correct location and pose prior to beginning the task. As another scenario, if any AMR 102 has a problem or failure, the cluster-level logic block 218 functions to make an appropriate decision to solve this problem. This may include switching the AMR to another role in the task cluster. Thus, the cluster-level logic block 218 functions as a real-time block that works for each task cluster. As a result, reliance is not concentrated in the task allocation engine block 210 for real time decisions that may be solved locally via the cluster-level logic block 218 functioning to "override" the initial AMR task allocation.

Thus, the cluster-level logic block 218 operates to monitor, control, and/or re-allocate AMRs 102 to tasks once assigned to initial tasks by the task allocation engine block 210. In any event, the task allocation engine block 210 and/or the cluster-level logic block 218 functions to output an AMR policy for the tasks assigned to each AMR 102 in a specific cluster, as noted in FIG. 2 as the AMR policies for tasks block 220. Each AMR 102 thus, once allocated a task (or re-allocated the task via the cluster-level logic block 218 if needed), performs the task in accordance with the task parameters defined for that specific task. Thus, FIG. 2 also illustrates an environment map 228 (i.e. the aforementioned shared environment model) that identifies the current status of each AMR, the members of each cluster, the state of each AMR 102, etc. In this way, the AMR policies for tasks block 220 is considered a task execution block, which interfaces with a simulator (i.e. the environment map 228) to pass control signals to the AMRs 102. At the same time, and as further discussed below, the system state estimation block 222 monitors the actions and progress of the AMRs 102 and the individual tasks.

Again, the environment map 228 may include data obtained from any suitable number and/or type of sensors, such as the environment monitoring devices 103, the on-board sensors identified with each of the AMRs 102, other suitable infrastructure monitors, etc. The overall status of the environment 100 may be represented as what may be referred to herein as environmental status data, which may include a combination of the AMR availability data (which indicates an AMR availability pool to perform tasks) and/or AMR state estimation data (which may identify the status of the AMRs 102, the status of tasks, etc.). The environmental status data may additionally or alternatively include any suitable type of data that may be identified with the environment 100, which may be determined from any suitable data sources as discussed herein. With reference to FIG. 2, the environmental status data may be identified by the system state estimation block 222, which may represent the entirety of or a portion of the shared environment model. Thus, the system state estimation block 222 may identify environmental status data that is indicative of any suitable portion of the environment 100 that is acquired via data transmissions received from the AMRs 102 or from any other suitable source of data within the environment 100 as discussed herein.

The MRTA system 200 may utilize the environmental status data provided by the system state estimation block 222 as feedback to allocate additional tasks to AMRs and/or to modify the allocation of tasks to AMRs. The system state estimation block 222 may include additional functionality as further discussed below to enable the AMRs 102 to autonomously identify failures and/or to perform tasks that were not initially allocated. In one scenario as shown in FIG. 2, the MRTA system 200 includes an AMR and cluster task completion logic block 224, which receives and/or otherwise accesses the environmental status data provided by the system state estimation block 222 to make a decision with respect to whether the AMR and cluster tasks have been completed. Thus, the AMR and cluster task completion logic block 224 may determine whether an AMR 102 has completed a specific task within its cluster and/or whether a cluster-assigned AMR 102 may be ready to be allocated to a new task and/or to a new cluster. If so, then the autonomous agent task data block 208 may update the AMR availability data that indicates the pool of AMRs 102 that are available for task allocation. Again, the AMR availability data may form part of the autonomous agent task data that is provided to the inputs of the task allocation engine block 210. Otherwise, the cluster-level logic block 218 may receive the environmental status data and use the current state of an AMR 102 to determine that the AMR 102 should not yet be re-allocated to a new task.

Again, the task allocation engine block 210 may receive, as inputs, the autonomous agent task data and a set of target vectors, for which the DL neural network implemented by the task allocation engine block 210 has been suitably trained. The MRTA system 200 may identify the available AMRs 102 in any suitable manner, which may include the aforementioned use of the environmental status data determined by the system state estimation block 222, the decisions made by the AMR and cluster task completion logic block 224, and/or known techniques such as receiving sensor data transmitted by the AMRs 102, indications that the AMRs 102 are currently charging, etc.

Additionally or alternatively however, and as discussed in further detail in this Section, the MRTA system 200 may further include an AMR health and failure prediction block 226 identifying the availability of AMRs 102 to perform certain tasks. The AMR health and failure prediction block 226 may thus function to identify the availability of AMRs 102 based upon certain conditions, as further discussed below, which may then be provided as part of the autonomous agent task data in autonomous agent task data block 208 that is provided to the task allocation engine block 210. Thus, the AMR health and failure prediction block 226 ensures that the MRTA system 200 allocates tasks to the available AMRs 102 in accordance with the health and overall status of the AMRs 102, which takes into consideration how effective each AMR 102 may be at performing specific tasks.

To do so, the AMR health and failure prediction block 226 represents the execution of (such as via the computing device 108) an AMR health and failure prediction algorithm that functions to calculate one or more metrics that facilitate the overall health and the capability of AMRs 102 to perform specific tasks based upon various conditions. Thus, the AMR health and failure prediction block 226 functions to calculate an individual AMR health metric, and may additionally or alternatively calculate an expected probability of task completion for the AMRs 102 to complete currently-allocated or future-allocated tasks. As further discussed herein, the AMR health and failure prediction block 226 calculates AMR health and performs, for a specific task and AMR 102, a failure prediction using the data that may be included as part of the environment model (i.e. the environmental status data determined by the system state estimation block 222). Again, the environmental status data may be acquired from any suitable number and/or type of sensors within the environment 100, such as AMR 102 on-board sensors, infrastructure sensors, cameras, etc.

Figure 6:
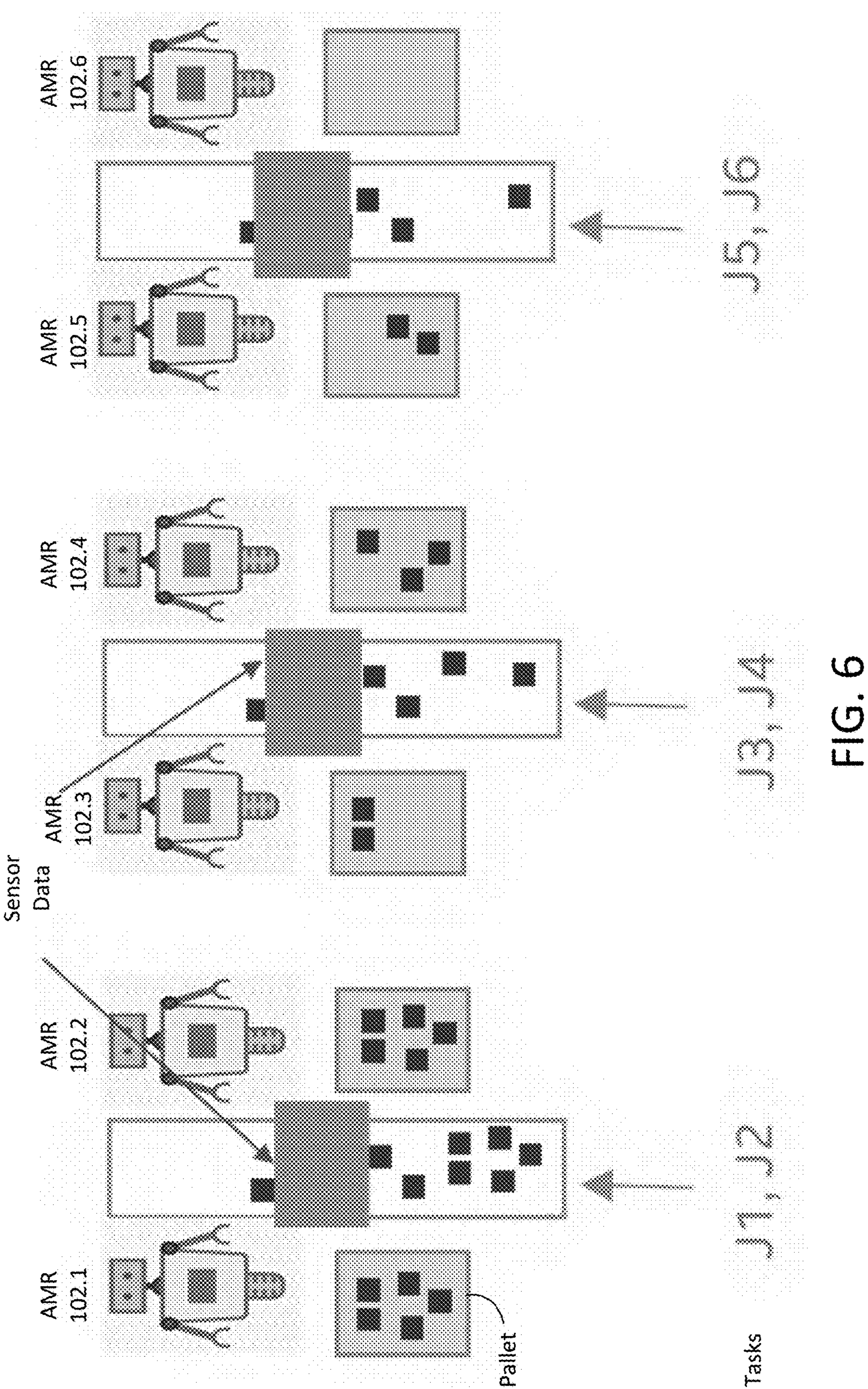
FIG. 6 illustrates a block diagram of a set of AMRs performing respective tasks, in accordance with the disclosure.

For ease of explanation, the functionality of the AMR health and failure prediction block 226 is described with respect to FIG. 6, which illustrates a set of AMRs performing respective tasks, in accordance with the disclosure. As shown in FIG. 6, each of the AMRs 102.1-102.6 is allocated a respective task J1-J6, which includes placing a number of objects from a conveyor belt onto a pallet. Each of the AMRs 102.1-102.6 may be allocated a task related to placing the objects onto a pallet from the conveyor belt, and then moving the objects, once placed onto the pallets, to a designated target area within the environment 100.

Figure 7:
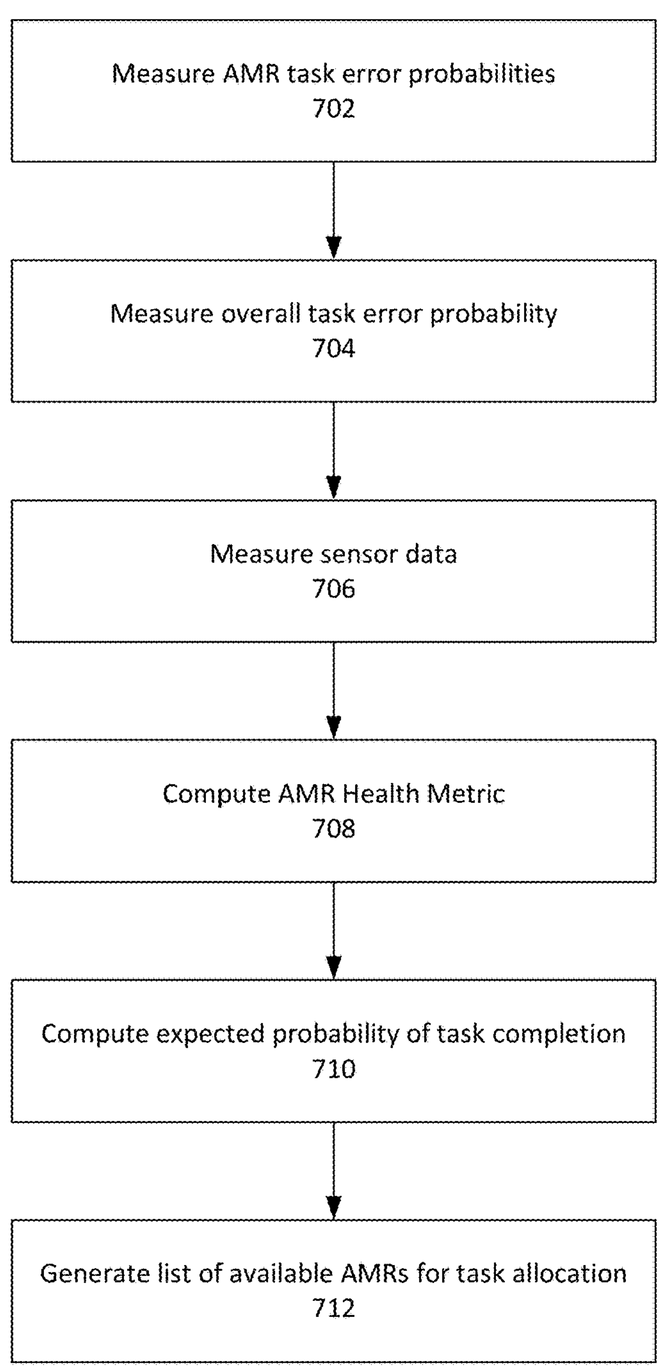
FIG. 7 illustrates a process flow for an AMR health and failure prediction to identify AMRs 102 available in an allocation pool, in accordance with the disclosure.

FIG. 7 illustrates a process flow for an AMR health and failure prediction algorithm that may be executed via the AMR health and failure prediction block 226 to identify which AMRs 102 are available in an allocation pool, and from which the task allocation engine block 210 may allocate tasks. To do so, the AMR health and failure prediction block 226 may be implemented as any suitable number and/or type of neural network, such as a DL neural network as discussed herein, which is provided as a non-limiting scenario, as other neural networks may alternatively be implemented. The neural network implemented by the AMR health and failure prediction block 226 may be trained in accordance with any suitable number and/or type of metrics that may be obtained via the shared environment model as discussed herein.

The process flow 700 of the AMR health and failure prediction algorithm as shown in FIG. 7 may begin by measuring (block 702) one or more task errors with respect to the tasks performed by the AMRs 102. The task error may be calculated on a per-task and per-AMR basis, with various metrics being used to calculate the error of various components or portions of a particular task that has been performed. That is, an AMR 102 as shown in FIG. 6 may perform tasks related to moving objects onto a pallet, navigating to a new area of the environment 100 to move the pallet to that location, and then unloading the objects on the pallet at a predefined location. Thus, this task has various portions related to different operational aspects of the AMR 102. The AMR health and failure prediction algorithm may calculate an overall cumulative failure probability $P_{FAILURE}$, which represents a weighted sum of the individually-calculated different types of errors related to each different portion of a particular task that has been performed by an AMR 102.

In the scenario described above, an AMR 102 is required to utilize a specific movement profile to perform each portion of the task, such as moving an arm in accordance with a specific pose, speed, and trajectory, navigating to a specific location with the pallet of objects along a planned route and at a minimum or predetermined speed, and then once again moving an arm in accordance with a specific pose, speed, and trajectory to unload the objects. With this in mind, the cumulative failure probability $P_{FAILURE}$ may be calculated in accordance with Eqn. 4 below as follows:

$$P_{FAILURE} = P(\mathrm{Error}_1)W_1 + P(\mathrm{Error}_2)W_2 + P(\mathrm{Error}_3)W_3 + \ldots + P(\mathrm{Error}_N)W_N, \quad \text{Eqn. 4}$$

where the individual errors $\mathrm{Error}_1$-$\mathrm{Error}_N$ represent any suitable number N of error metrics (such as error probabilities expressed as proportions or percentages) that are calculated in accordance with the various portions of a particular task. Each error metric may represent an error with respect to a deviation between a predetermined movement profile and a measured movement profile while the AMR 102 previously performed tasks, which may be tracked over any suitable time period Thus, the error metric $\mathrm{Error}_1$ may represent a pose error related to an arm of the AMR 102 deviating from an expected trajectory in three-dimensional space, the error metric $\mathrm{Error}_2$ may represent a grasp error related to the arm of the AMR 102 grasping too lightly or too strongly, the error metric $\mathrm{Error}_3$ may represent a joint angle error with respect to the angle formed between mechanical joints of the AMR 102, etc. Additional error metrics may be calculated using any other aspect of the task performance metrics, such as deviations between the speed of the AMR and a commanded speed, deviations between the path calculated for the AMR and the actual path followed by the AMR, etc. Each of the individual error probabilities may then be weighted in accordance with any suitable weighting scheme to prioritize or emphasize certain types of error metrics over others.

Regardless of the number and/or type of error metrics that are calculated in this manner, the deviation from a predetermined movement profile may be calculated in any suitable manner using feedback obtained via the AMR 102 onboard sensors or other suitable sensors present in the environment 100 (such as the environment monitoring devices 103). The AMR policies for tasks block 220 may include data associated with these predetermined movement profiles, or this data may otherwise be readily known to the MRTA system 200. That is, the predetermined movement profile data may correspond to the specific movement parameters, trajectory, speed, route, pose, three-dimensional motion, etc., that an AMR 102 is to execute to perform the particular task to which it is allocated.

Figure 8B:
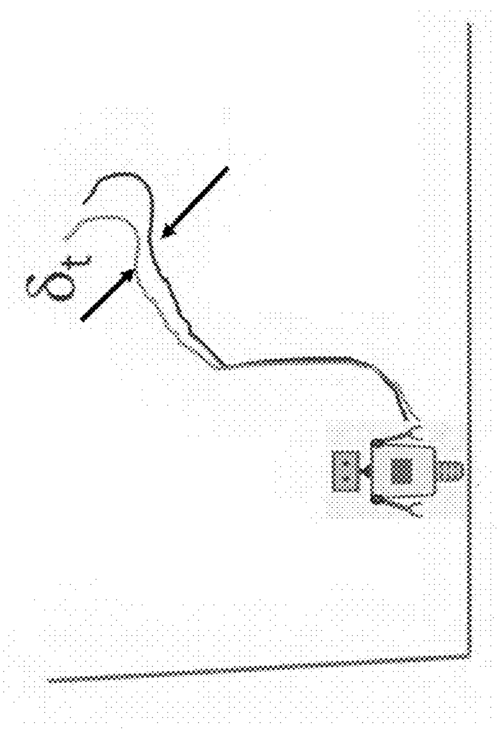
FIG. 8B illustrates the calculation of a navigational error probability, in accordance with the disclosure.
Figure 8A:
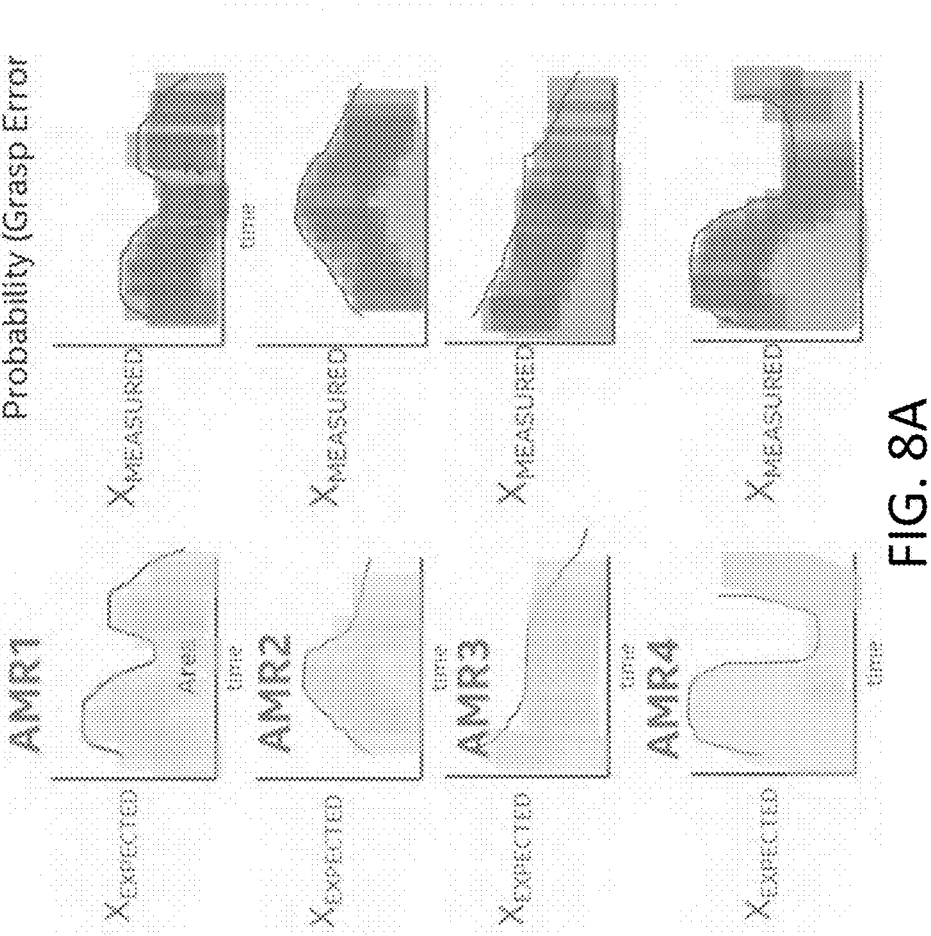
FIG. 8A illustrates the calculation of a gripping error probability, in accordance with the disclosure.

In one illustrative scenario as shown in FIG. 8A, a gripping or grasp error probability is calculated as one of the error metrics $\text{Error}_1$-$\text{Error}_N$ in Eqn. 4 as discussed above for four different AMRs 102. As shown in FIG. 8A, in each case an expected movement profile $X_{EXPECTED}$ (the trajectory of the grasp) over time is known and represented as the graph on the left side in FIG. 8A. The expected or predetermined movement profile may correspond to the information known by the MRTA system 200, which may be transmitted to the AMRs 102 as part of a command, or otherwise known a priori by the MRTA system 200. Again, the measured movement profile $X_{MEASURED}$, may be calculated as feedback from data received from the onboard sensors of the AMR 102, or other suitable sensors present in the environment 100 (such as the environment monitoring devices 103). In any event, the grasp error probability represents a deviation between the predetermined movement profile $X_{EXPECTED}$ and the measured movement profile $X_{MEASURED}$ while the AMR 102 previously performed the task. The calculated error probability for this particular portion of the task, i.e. the gripping or grasp error probability, may be calculated based upon a ratio of the areas under the curve of each of the measured movement profiles in accordance with Eqn. 5 below as follows:

$$P_{Grasp\ Error} = \left| \frac{\text{Area in } X_{Measured}}{\text{Area in } X_{Expected}} \right| \qquad \text{Eqn. 5}$$

This technique may be expanded to include other types of task errors, such as navigational errors, as shown in FIG. 8B. FIG. 8B illustrates a deviation in this case between an expected or predetermined movement profile that comprises a planned route and the actual route taken by an AMR 102. The navigational error probability may be calculated in a similar manner as noted above for the grasp error probability, with the calculated navigational error probability as shown in FIG. 8B represented as St. Any suitable number of probability error metrics may be calculated in this manner to thus obtain an overall task error probability for the AMR 102 performing a specific task by performing a weighted summation of the individual AMR task error probabilities (block 704).

The process flow 700 may optionally include the measurement of sensor data (block 706). This sensor data may be obtained from onboard sensors implemented by the AMRs 102 or from any suitable sensors present in the environment 100 (such as the environment monitoring devices 103). The measured sensor data may include sensor data in addition to or instead of the sensor data used to measure the AMR task error probabilities as noted above. In various scenarios, the sensor measurements may include sensor data indicative of abnormal conditions for the AMRs such as noise, vibrations, power consumption, temperature, etc. The sensor measurement data may additionally or alternatively include data obtained via a "stress test" of an AMR, i.e. the response of an AMR 102 to a specific sequence of tasks used to characterize health. The various sensor data, as well as the calculated task error probability, are then provided as inputs to the DL neural network implemented by the AMR health and failure prediction block 226 as noted above. The AMR health and failure prediction block 226 may be trained in accordance with any suitable type of training data that includes an adequate representation of the sensor data and the calculated task error probabilities. Thus, this training data may include correlations of measured and expected values of sensor data for various portions of different types of tasks, or any other suitable type of data that may identify the overall health of AMRs and/or the ability of AMRs 102 to perform specific types of tasks and/or portions of tasks.

Thus, using these aforementioned inputs, the trained DL neural network of the AMR health and failure prediction block 226 may output a computed AMR health metric (block 708) and an expected probability of an AMR to complete a future task (block 710) based upon the performance of the AMR performing previous tasks. Using these metrics, the AMR health and failure prediction block 226 may provide data to the autonomous agent task data block 208 to update the AMR availability pool by generating a list of available AMRs for task allocation (block 712). Any information calculated via the AMR health and failure prediction block 226 may additionally or alternatively be provided to the GUI 202, as shown in FIG. 8C, which may be used to manually adjust the AMR availability pool or otherwise provide real-time monitoring functionality. This may include additional metrics such as a mean time between failure (MTBF) that is calculated via the trained DL neural network implemented via the AMR health and failure prediction block 226, as well as the predicted errors identified with specific AMRs 102 performing specific types of tasks (i.e. the error probabilities of the different portions of the tasks as noted above), the expected error to perform the entirety of an allotted task (i.e. the cumulative calculated error probability metrics noted above), etc.

One or more of these metrics may be used as conditions that may form part of the autonomous agent task data, and thus part of the logic used by the task allocation engine block 210 to perform AMR task allocation. In one scenario, an AMR health metric being below a certain threshold may result in the AMR being decommissioned and/or removed from the AMR availability pool. In another scenario, the allocation of the task may be conditioned upon the AMR 102 having an expected probability of task completion that is above a predetermined threshold value. In this way, the task allocation engine block 210 may adapt the manner in which task allocation is performed based upon the data provided by the AMR health and failure prediction block 226.

The AMR health and failure prediction block 226 may optionally function to update the AMR availability pool and/or the autonomous agent task data using other techniques additionally or alternatively to those discussed above. That is, the various inputs to the DL neural network implemented by the AMR health and failure prediction block 226 may be used as part of a separate trained DL neural network or any other suitable algorithm to intelligently identify potential issues with specific AMRs 102 performing specific tasks or portion of tasks. In one scenario, the AMR health and failure prediction block 226 may cross-correlate the movement profile measurements with specific expected AMR actions in accordance with a current task policy. This may include the use of measured AMR waypoints vs input AMR waypoints as noted above to calculate the navigational or path error, but in this scenario the data may be additionally or alternatively used to match AMR tasks or portions thereof to a specific AMR condition.

That is, a high correlation between the expected and measured movement profiles may indicate a high task accuracy, whereas a low correlation between the expected and measured movement profiles may indicate a low task accuracy. Any suitable threshold may be devised to differentiate between a high and a low task accuracy in this manner. Moreover, additional thresholds may be defined that indicate non-responsiveness of the AMR 102 to specific policy commands, or the progress of task completion may be monitored to indicate that the task has not been successfully completed, either of which may be highly indicative of an AMR malfunction or failure.

But because the calculated error probabilities are both AMR- and task-dependent, this data may be leveraged to update the autonomous agent task data such that AMRs 102 suffering from such malfunctions or low task accuracies need not be immediately removed altogether from the task allocation pool. Instead, such AMRs 102 may remain available to be allocated tasks, but the specific type of tasks may be updated by the task allocation engine block 210. Thus, and continuing the scenario above for the calculation of a path error, an AMR 102 that is identified as having a low path accuracy (i.e. a high calculated probability error exceeding a predetermined threshold value) may, for future task allocations, not be assigned to navigation-based tasks or minimally allocated to such tasks. Other scenarios may include ensuring the re-allocation of AMRs 102 moving under a nominal speed to perform manipulation tasks, re-allocating AMRs 102 having a low grasping accuracy to perform navigation tasks, re-allocating AMRs 102 that have a battery capacity less than a predetermined threshold value to charge at a charging station etc. This may be implemented in some scenarios via an updating of the task priority parameters, task priority parameter weights, cost factors, cost factor weights, reward metric weights, etc., as discussed above.

Thus, the MRTA system 200 functions to continuously re-allocate the AMRs 102 as tasks are completed and/or as additional feedback is received with respect to the environment 100 and additional decisions are made regarding the availability or AMRs 102 and/or the availability of AMRs to perform specific types of tasks.

AMR Task Detection and Cognitive Task Reasoning

As discussed above, the MRTA system 200 dynamically allocates AMRs 102 to specific tasks as the number and/or type of tasks, the available AMRs 102, and/or the task parameters identified with each task, may change over time. The MRTA system 200 may be controlled or otherwise implemented by a central controller or other suitable component of the MRTA system 200, such as the computing device 108 as noted herein. However, the AMRs 102 may also perform monitoring and cognitive-based functions using acquired sensor data, which may be used by the MRTA system 200 to further influence how and when tasks are allocated. This Section is further directed to such scenarios.

In accordance with such scenarios, the sensor data acquired via the onboard sensors of the AMRs 102 and/or other suitable sensors present in the environment 100 (such as the environment monitoring devices 103) may be leveraged by the MRTA system 200 to identify and allocate additional tasks. In the scenarios discussed herein, any suitable number and/or type of sensor data sources may be implemented to facilitate this functionality. The functionality described in this Section may be performed independently via the AMRs 102 and/or in conjunction with the system state estimation block 222, which again monitors the actions and progress of the AMRs 102 and the individual tasks.

Figure 9:
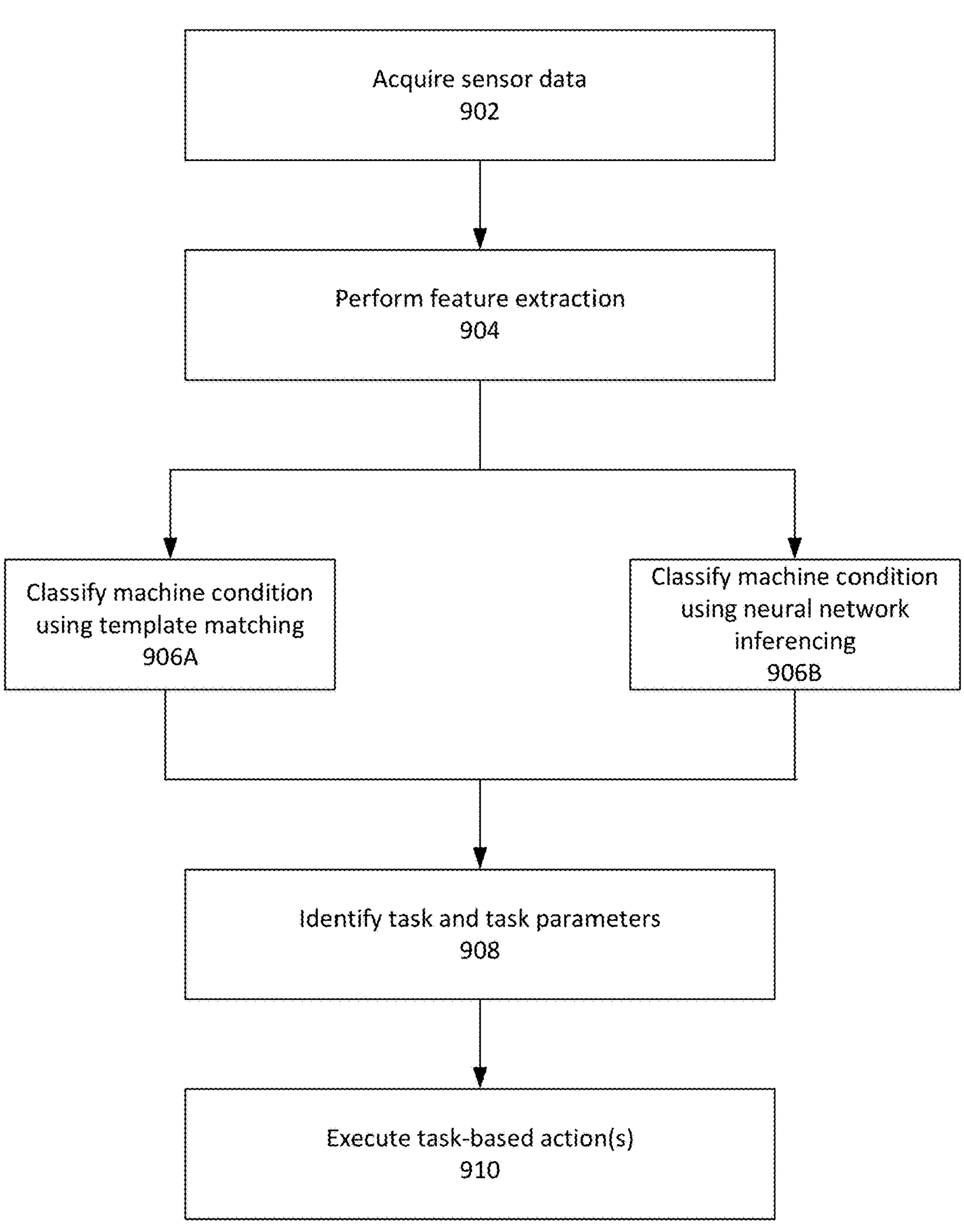
FIG. 9 illustrates a process flow identified with the identification of tasks via sensor data acquisition, in accordance with the disclosure.

FIG. 9 illustrates a process flow identified with one or more task identification algorithms, in accordance with the disclosure. The process flow 900 may be implemented via any suitable combination of the AMRs 102 and components of the MRTA system 200, such as the computing device 108 (the functionality of which may be identified with the system state estimation block 222). In any event, the process flow 900 may begin by acquiring sensor data (block 902). The sensor data may be acquired from any suitable sensor source, such as onboard sensors of the AMRs 102 and/or other suitable sensors present in the environment 100 (such as the environment monitoring devices 103), and may represent images or other suitable types of sensor-based data such as LIDAR sensor data, radar sensor data, etc. In any event, the acquired sensor data may identify a localized portion of the environment 100, and may include any suitable number of target objects, machines, other AMRs 102, etc. The sensor data may be acquired at any suitable time, such as while an AMR 102 is performing a specific task or between performing tasks (such as when the AMR 102 is in the availability pool but not yet allocated to perform a task).

The process flow 900 may include the extraction (block 904) of features associated with the acquired sensor data. The feature extraction may be performed locally via the AMRs 102 and/or offloaded to components of the MRTA system 200 such as the computing device 108, which may receive the sensor data via AMR 102 data transmissions. The feature extraction may be of any suitable type, including known types, and may be implemented dependent upon the particular type of sensor data, task, machine, etc.

In some scenarios, the extracted features may readily identify a particular machine classification that is to be solved via the allocation of a task to an AMR 102, whereas other more complex machine classifications may require additional or alternate processing. Thus, in accordance with some scenarios, the classification of a particular machine condition, which results in the identification of a corresponding task and task parameters to rectify the machine condition, may be accomplished via a direct analysis of the extracted features (block 906A). This may include the use of any suitable techniques, such as template matching, the use of predetermined environment models, graphs, or any suitable known techniques.

In scenarios in which template matching is implemented, the acquired image(s) may be compared (via the AMRs 102 or other components of the MRTA system 200 such as the computing device 108) to images stored in a database that correspond to the same machine or other portion of the environment as the acquired image(s). Such a database may be stored in the computing device 108, the cloud server(s) 110, etc. Template matching techniques may identify the appropriate images for template matching using any suitable localization techniques, which may leverage onboard AMR sensors or other suitable infrastructure sensors within the environment 100 to correlate the acquired images to template images stored in the database based upon the location and/or orientation of the AMR 102 or other suitable sensor data source, which may be readily known or obtained as part of the data transmissions or other transmissions. The stored template images may represent the "normal" operating state of the machine that is observed. The extracted features may then be compared to a set of predetermined features present in the template image to thereby classify the machine condition as normal or abnormal. In accordance with such scenarios, the template matching technique may identify issues with an abnormal operating state such as weld breakages, missing screws, disconnected wires, etc.

Thus, in one scenario, to perform task identification an image classification and reasoning problem is solved in which multiple images of each machine or other object of interest in the environment 100 is stored in both a good (i.e. operating or normal) and bad (i.e. anomalous, malfunctioning, etc.) condition. Then, the AMR 102 scans the machine (i.e. images the machine via cameras or other onboard sensors) and transmits the image to the computing device 108 (or other suitable network infrastructure component such as the cloud server(s) 110) server. The template matching algorithm executed by the computing device 108 (such as via the system state estimation block 222) then matches the acquired images with those stored in the image database. Then, the template matching algorithm provides the instructions to the AMR 102 to address the problem. In the event that the problem type is also pre-stored in the database, the instructions may be readily provided to the AMR, which will then fix the machine. However, if the problem is not available in the database, then other suitable techniques may be implemented, such as a knowledge tree, to reason and infer the problem and then instruct the AMR 102 how to fix it.

Moreover, for more complex issues, the MRTA system 200 may implement any suitable type of neural network, such as a convolutional neural network (CNN), to analyze the image(s) in accordance with the extracted features and classify the machine condition (block 906B). Such a CNN, when implemented, may be trained in accordance with any suitable type of training dataset that identifies images of various machinery in the environment 100 in different states of known issues, malfunctions, etc. The AMRs 102 and/or other components of the MRTA system 200 such as the computing device 108 may then use the extracted features as inputs to the trained CNN to classify the machine condition. The use of the neural network inferencing (block 906B) may occur in addition to or instead of the template matching techniques discussed above. The use of the CNN may be particularly useful for more complex issues in which inferencing is beneficial to determine the machine classification such as a machine being in the wrong orientation, parts stuck in the machine, a fluid leakage that requires cleanup, etc.

Regardless of how the machine condition is classified, the process flow 900 includes an identification of a task and accompanying task parameters to perform the task (block 908) to rectify the abnormal condition and to return the machine condition to a predetermined (i.e. normal) operating state. The task and task parameters may be identified autonomously and independently via the AMRs 102 and/or other components of the MRTA system 200 such as the computing device 108. In any event, the task and accompanying task parameters may be identified using any suitable techniques that leverage knowledge of the environment model, which may be derived from the environmental status data determined by the system state estimation block 222 as discussed herein.

As one scenario, there may be multiple anomalies present in a machine at the same time, such as wires disconnected, weld joints broken, parts stuck in machine, failure of motor, etc. Thus, the identification of a task and accompanying task parameters to perform the task may include the execution of any suitable type of image processing algorithm to recognize each of these anomalies separately. Knowledge graphs may be additionally implemented to first identify all possible scenarios that will result in machine failure in a step-by-step manner. In one scenario this may include one screw being loose, which results in the algorithm then checking whether other screws are fastened properly. As another scenario, if one weld is broken, then the algorithm may verify whether other nearby weld joints are acceptable.

The execution of a knowledge graph algorithm in this manner may enable a concurrent deduction and identification of all problems given a set of images. Then, once the problem is identified, the identification of a task and accompanying task parameters to perform the task (block 908) may include the execution of any suitable algorithm that identifies a planned solution for each identified problem using motion primitive gripper types and other required accessories of the AMR 102. As one illustrative scenario, if wires are broken, the AMRs may change the gripper to enable reconnecting the broken wires. As another illustrative scenario, if the weld joint is broken, the AMRs will change the gripper, plan a trajectory, and re-do the welding operation.

In any event, the actual motion of the AMR 102 for the repair is planned again via execution of the algorithm locally at the AMR 102 using motion primitives. That is, the algorithm (either locally-executed via the AMR 102 or via another computing device such as the computing device 108) plans the robot actions step-by-step using a library of AMR actions (also called motion primitives) and then instructs the AMR to act accordingly.

Thus, in one scenario, once an anomaly is determined, the algorithm executes task-based actions (block 910) in accordance with the defined task parameters. The AMR 102 thus iteratively attempts to remove the anomaly using its motion primitives' library as defined by the task parameters. To this end, the algorithm functions to decompose the goal first into task portions, and then iteratively performs each portion of the task to verify the resulting task accuracy of performing each task portion, as discussed above. Of course, for routine maintenance tasks, this approach is also applicable to enable an AMR 102 to check for pre-stored instructions to resolve the task using appropriate tools (e.g. right gripper, weld tools, etc.).

Any information calculated via the execution of the algorithm as discussed above with respect to the process flow 900 may additionally or alternatively be provided to any suitable components of the MRTA system 200. In one scenario, this data may be provided to the GUI 202, as shown in FIG. 10, which may be used to manually adjust the AMR availability pool or otherwise provide real-time monitoring functionality. This may include information such as features checked, an identification of anomalies, a solution/task to address the anomaly, an action plan that is defined in accordance with the task parameters for that task, a status of the task, etc.

Additionally or alternatively, the information calculated via the execution of the algorithm as discussed above with respect to the process flow 900 may be used to update the AMR availability pool and/or to add new tasks to the set of tasks input to the task allocation engine block 210. This may be represented by the emergency request for AMR allocation as shown in FIG. 2. Thus, any suitable components of the MRTA system 200 (such as the computing device 108) may receive task-identification data transmitted by an AMR 102 that indicates an additional task detected via execution of the algorithm as discussed above with respect to the process flow 900 as noted herein. The task allocation engine block 210 may thus utilize the task-identification as noted above to update the set of tasks and thus generate updated AMR task allocation data that allocates the additional identified task to one of the AMRs 102. This may be performed in one scenario by updating the task priority parameters, task priority parameter weights, cost factors, cost factor weights, reward metric weights, etc., as discussed above.

AMR Design and Configuration

Figure 11:
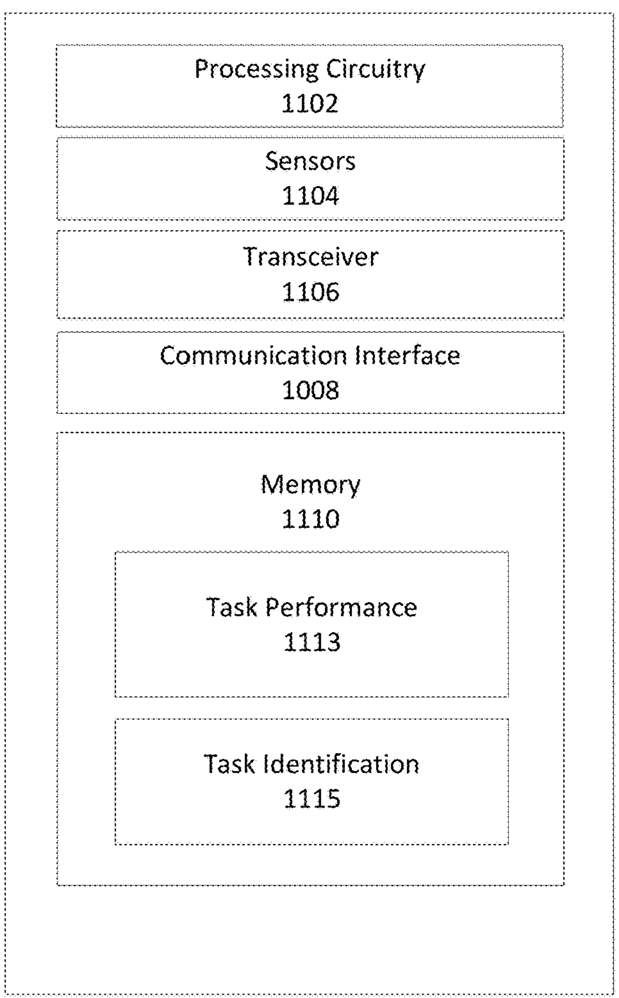
FIG. 11 illustrates a block diagram of an autonomous agent, in accordance with the disclosure.

FIG. 11 illustrates a block diagram of an exemplary autonomous agent, in accordance with an aspects of the disclosure. In an aspect, the autonomous agent 1100 as shown and described with respect to FIG. 11 may be identified with one or more of the AMRs 102 as shown in FIG. 1 and discussed herein. As further discussed herein, the autonomous agent 1100 may operate in the environment 100 to perform various allocated tasks as allocated by the MRTA system 200 or autonomously by the autonomous agent 1100. Thus, the autonomous agent 1100 may perform the various functionality as described herein with respect to performing allocated tasks, acquiring sensor data, transmitting sensor data, task-identification data, and/or any other suitable type of information to a computing device identified with the MRTA system 200, such as the computing device 108, performing route navigation, etc. To do so, the autonomous agent 1100 may include processing circuitry 1102, sensors 1104, a transceiver 1106, communication interface 1108, and a memory 1110. The components shown in FIG. 11 are provided for ease of explanation, the autonomous agent 1100 may implement additional, less, or alternative components as those shown in FIG. 11.

The processing circuitry 1102 may be configured as any suitable number and/or type of computer processors, which may function to control the autonomous agent 1100 and/or other components of the autonomous agent 1100. The processing circuitry 1102 may be identified with one or more processors (or suitable portions thereof) implemented by the autonomous agent 1100. The processing circuitry 1102 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1102 may be configured to carry out instructions to perform arithmetical, logical, and/or input/output (I/O) operations, and/or to control the operation of one or more components of autonomous agent 1100 to perform various functions associated with the aspects as described herein. The processing circuitry 1102 may include one or more microprocessor cores, memory registers, buffers, clocks, etc., and may generate electronic control signals associated with the components of the autonomous agent 1100 to control and/or modify the operation of these components. The processing circuitry 1102 may be configured to communicate with and/or control functions associated with the sensors 1104, the transceiver 1106, the communication interface 1108, and/or the memory 1110. The processing circuitry 1102 may additionally perform various operations to control the movement, speed, and/or tasks executed by the autonomous agent 1100, as discussed herein.

The sensors 1104 may be implemented as any suitable number and/or type of sensors that may be used for autonomous navigation and environmental monitoring. Examples of such sensors may include radar, LIDAR, optical sensors, cameras, compasses, gyroscopes, positioning systems for localization, accelerometers, etc.

The transceiver 1106 may be implemented as any suitable number and/or type of components configured to transmit and/or receive data packets and/or wireless signals in accordance with any suitable number and/or type of communication protocols. The transceiver 1106 may include any suitable type of components to facilitate this functionality, including components associated with known transceiver, transmitter, and/or receiver operation, configurations, and implementations. Although depicted in FIG. 11 as a transceiver, the transceiver 1106 may include any suitable number of transmitters, receivers, or combinations of these that may be integrated into a single transceiver or as multiple transceivers or transceiver modules. The transceiver 1106 may include components typically identified with an RF front end and include, antennas, ports, power amplifiers (PAS), RF filters, mixers, local oscillators (LOs), low noise amplifiers (LNAs), upconverters, downconverters, channel tuners, etc.

Regardless of the particular implementation, the transceiver 1106 may receive control signals and/or commands from one or more components of the MRTA system 200 such as the computing device 108 and/or may transmit any suitable type of data to components implemented via the MRTA system 200 to enable task allocation and other functions, as discussed herein.

The communication interface 1108 may be configured as any suitable number and/or type of components configured to facilitate the transceiver 1106 receiving and/or transmitting data and/or signals in accordance with one or more communication protocols, as discussed herein. The communication interface 1108 may be implemented as any suitable number and/or type of components that function to interface with the transceiver 1106, such as analog-to-digital converters (ADCs), digital to analog converters, intermediate frequency (IF) amplifiers and/or filters, modulators, demodulators, baseband processors, etc. The communication interface 1108 may thus work in conjunction with the transceiver 1106 and form part of an overall communication circuitry implemented by the autonomous agent 1100.

In an aspect, the memory 1110 stores data and/or instructions such that, when the instructions are executed by the processing circuitry 1102, cause the autonomous agent 1100 to perform various functions as described herein, such as those described herein, such identifying tasks and/or executing allocated tasks as discussed herein. The memory 1110 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1110 may be non-removable, removable, or a combination of both. For example, the memory 1110 may be implemented as a non-transitory computer readable medium storing one or more executable instructions such as, for example, logic, algorithms, code, etc.

As further discussed below, the instructions, logic, code, etc., stored in the memory 1110 are represented by the various modules as shown in FIG. 11, which may enable the functions of the autonomous agent 1100 as disclosed herein to be implemented. Alternatively, if implemented via hardware, the modules shown in FIG. 11 associated with the memory 1110 may include instructions and/or code to facilitate control and/or monitor the operation of such hardware components. In other words, the modules shown in FIG. 11 are provided for ease of explanation regarding the functional association between hardware and software components. Thus, the processing circuitry 1102 may execute the instructions stored in these respective modules in conjunction with one or more hardware components to perform the various functions associated with the techniques as further discussed herein.

The executable instructions stored in the task performance module 1113 may facilitate, in conjunction with execution via the processing circuitry 1102, the autonomous agent 1100 performing allocated tasks in accordance with a specific task policy as discussed herein. This may include translating control signals or other commands transmitted to the autonomous agent via one or more components of the MRTA system 200 to execute tasks as the tasks are allocated to the autonomous agent 1100. Additionally or alternatively, the executable instructions stored in the task performance module 1113 may facilitate the autonomous agent 1100 executing any suitable type of task or functions related to tasks in accordance with received commands, which may include the execution of predetermined sequences and/or the transmission of measured movement profile data to enable the MRTA system 200 to perform failure probability measurements and/or to monitor the accuracy, status, progress, etc., with respect to allocated tasks.

In an aspect, the executable instructions stored in the task identification module 1115 may facilitate, in conjunction with execution via the processing circuitry 1102, the autonomous agent 1100 identifying tasks using acquired sensor data as discussed herein. This may include the autonomous identification of tasks to be performed, the classification of machine conditions, the identification of task parameters, etc., as discussed herein. This may additionally include the transmission of task-identification data to enable the MRTA system 200 to re-allocate tasks to other AMRs 102.

Central Controller Design and Configuration

Figure 12:
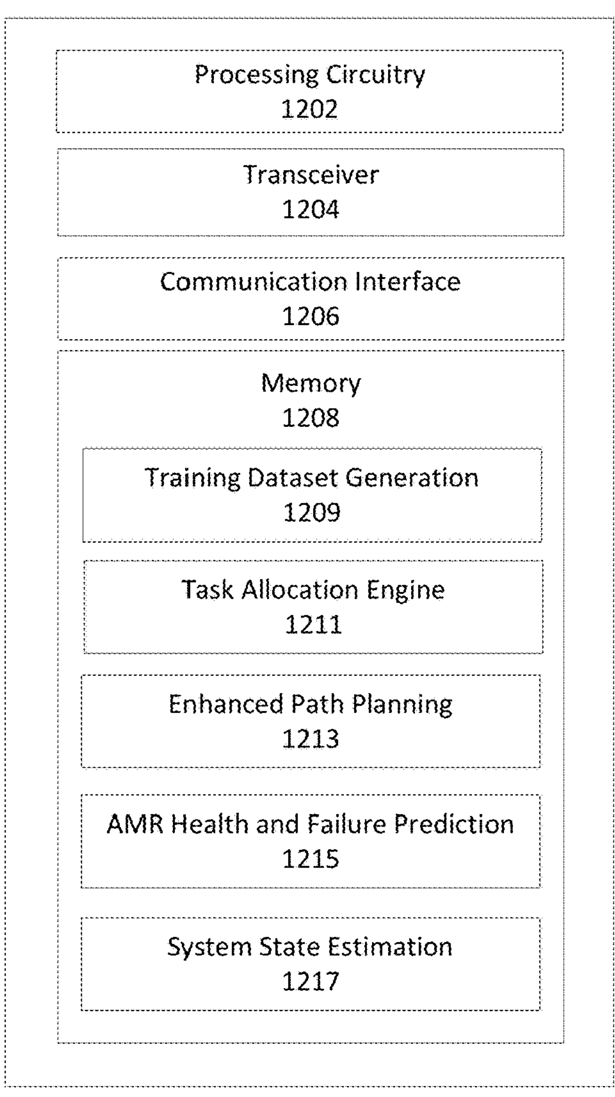
FIG. 12 illustrates a block diagram of a computing device, in accordance with the disclosure.

FIG. 12 illustrates a block diagram of an exemplary computing device, in accordance with an aspects of the disclosure. In an aspect, the computing device 1200 as shown and described with respect to FIG. 12 may be identified with a central controller and be implemented as any suitable network infrastructure component, such as the computing device 108 as shown in FIG. 1 and discussed herein, for instance, which may be implemented as an Edge network server, controller, computing device, etc. As further discussed below, the computing device 1200 may serve the environment 100 in accordance with the various techniques as discussed herein with respect to the MRTA system 200. Thus, the computing device 1200 may perform the various functionality as described herein with respect to generating training datasets, allocating AMRs 102 to tasks, performing enhanced path planning functions, calculating AMR health and failure probabilities with respect to the AMRs performing or completing tasks, communicating with the AMRs 102 to identify new tasks, etc. To do so, the computing device 1200 may include processing circuitry 1202, a transceiver 1204, communication interface 1206, and a memory 1208. The components shown in FIG. 12 are provided for ease of explanation, and the computing device 1200 may implement additional, less, or alternative components as those shown in FIG. 12.

The processing circuitry 1202 may be configured as any suitable number and/or type of computer processors, which may function to control the computing device 1200 and/or other components of the computing device 1200. The processing circuitry 1202 may be identified with one or more processors (or suitable portions thereof) implemented by the computing device 1200. The processing circuitry 1202 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1202 may be configured to carry out instructions to perform arithmetical, logical, and/or input/output (I/O) operations, and/or to control the operation of one or more components of computing device 1200 to perform various functions associated with the MRTA system 200 as described herein. The processing circuitry 1202 may include one or more microprocessor cores, memory registers, buffers, clocks, etc., and may generate electronic control signals associated with the components of the computing device 1200 to control and/or modify the operation of these components. The processing circuitry 1202 may communicate with and/or control functions associated with the transceiver 1204, the communication interface 1206, and/or the memory 1208. The processing circuitry 1202 may additionally perform various operations to control the communications, communications scheduling, and/or operation of other network infrastructure components that are communicatively coupled to the computing device 1200.

The transceiver 1204 may be implemented as any suitable number and/or type of components configured to transmit and/or receive data packets and/or wireless signals in accordance with any suitable number and/or type of communication protocols. The transceiver 1204 may include any suitable type of components to facilitate this functionality, including components associated with known transceiver, transmitter, and/or receiver operation, configurations, and implementations. Although depicted in FIG. 12 as a transceiver, the transceiver 1204 may include any suitable number of transmitters, receivers, or combinations of these that may be integrated into a single transceiver or as multiple transceivers or transceiver modules. The transceiver 1204 may include components typically identified with an RF front end and include, for example, antennas, ports, power amplifiers (PAS), RF filters, mixers, local oscillators (LOs), low noise amplifiers (LNAs), upconverters, downconverters, channel tuners, etc.

The communication interface 1206 may be configured as any suitable number and/or type of components configured to facilitate the transceiver 1204 receiving and/or transmitting data and/or signals in accordance with one or more communication protocols, as discussed herein. The communication interface 1206 may be implemented as any suitable number and/or type of components that function to interface with the transceiver 1204, such as analog-to-digital converters (ADCs), digital to analog converters, intermediate frequency (IF) amplifiers and/or filters, modulators, demodulators, baseband processors, etc. The communication interface 1206 may thus work in conjunction with the transceiver 1204 and form part of an overall communication circuitry implemented by the computing device 1200, which may be implemented via the computing device 1200 to transmit commands and/or control signals to the AMRs 102 to execute any of the functions describe herein such as task allocation, following an enhanced path, receiving sensor data for AMR health and/or failure prediction analysis, receiving environmental status data, receiving task-identification data transmitted by an AMR 102, etc.

The memory 1208 is configured to store data and/or instructions such that, when the instructions are executed by the processing circuitry 1202, cause the computing device 1200 to perform various functions as described herein, such as those described herein with reference to the MRTA system 200. The memory 1208 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1208 may be non-removable, removable, or a combination of both. The memory 1208 may be implemented as a non-transitory computer readable medium storing one or more executable instructions such as, for example, logic, algorithms, code, etc.

As further discussed below, the instructions, logic, code, etc., stored in the memory 1208 are represented by the various modules/engines as shown in FIG. 12, which may enable the various functions of the MRTA system 200 as disclosed herein to be functionally realized. Alternatively, if implemented via hardware, the modules/engines shown in FIG. 12 associated with the memory 1208 may include instructions and/or code to facilitate control and/or monitor the operation of such hardware components. In other words, the modules/engines as shown in FIG. 12 are provided for ease of explanation regarding the functional association between hardware and software components. Thus, the processing circuitry 1202 may execute the instructions stored in these respective modules/engines in conjunction with one or more hardware components to perform the various functions as discussed herein.

The training dataset generation module 1209 may execute the functionality described herein as discussed with reference to the dataset creation block 204 and the DL network training and module updating block 206. The executable instructions stored in the training dataset generation module 1209 may facilitate, in conjunction with execution via the processing circuitry 1202, the computing device 1200 receiving a set of task parameters identified with various tasks as inputs and generating target vectors that represent an allocation of specific AMRs 102 to specific tasks, as discussed above. The executable instructions stored in the training dataset generation module 1209 may also facilitate the training of the neural network implemented via the task allocation engine block 210.

The task allocation engine 1211 may execute the functionality described herein as discussed with reference to the task allocation engine block 210. The executable instructions stored in the task allocation engine 1211 may facilitate, in conjunction with execution via the processing circuitry 1202, the computing device 1200 receiving autonomous agent task data and target vectors as inputs, and generating autonomous agent allocation data as an output, which allocated AMRs 102 to specific tasks as discussed above. Thus, the task allocation engine 1211 may represent the implementation of a neural network (such as a DL neural network) that has been trained using the generated training dataset discussed herein.

The enhanced path planning module 1213 may execute the functionality described herein with reference to the enhanced path planner block 214. Thus, the executable instructions stored in the enhanced path planning module 1213 may facilitate, in conjunction with execution via the processing circuitry 1202, the computing device 1200 identifying high connectivity and low congestion routes as discussed herein. The enhanced path planning module 1213 may further facilitate the transmission of the routes to the AMRs via the transceiver 1204 and communication interface 1206.

The AMR health and failure prediction module 1215 may execute the functionality as described with reference to the AMR health and failure prediction block 226. Thus, the executable instructions stored in the AMR health and failure prediction module 1215 may facilitate, in conjunction with execution via the processing circuitry 1202, the computing device 1200 calculating individual AMR health metrics and/or calculating an expected probability of task completion for the AMR 102 to complete a currently-allocated or future-allocated task, as discussed herein.

The system state estimation block 1217 may execute the functionality as described with reference to the system state estimation block 222. Thus, the executable instructions stored in the system state estimation block 1217 may facilitate, in conjunction with execution via the processing circuitry 1202, the computing device 1200 monitoring the environment 100 and/or the AMRs 102 to update the AMR availability pool and/or set of tasks to be performed. This may include receiving (via the transceiver 1204 and communication interface 1206) task-identification data transmitted by an AMR 102 that is indicative of a task detected by the AMR 102. This may additionally or alternatively include providing this information to the task allocation engine block 210 for the generation of subsequent autonomous agent task allocation data that allocates the identified task to one of the AMRs 102, as discussed herein.

General Operation of a Computing Device

A computing device is provided. With reference to FIGS. 1 and 2 and the central controller, the computing device includes a memory configured to store computer-readable instructions; and processing circuitry configured to execute the computer-readable instructions to cause the computing device to: receive autonomous agent task data including (i) a set of tasks to be performed by a plurality of autonomous agents operating within an environment, and (ii) a set of task parameters identified with each respective one of the set of tasks, training a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network, to the autonomous agent task data and to the set of target vectors, autonomous agent task allocation data that allocates each one of the plurality of autonomous agents to a respective one of the set of tasks. Each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks. In addition or in alternative to and in any combination with the optional features previously explained in this paragraph, the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks. In addition or in alternative to and in any combination with the optional features previously explained in this paragraph, the set of reward metrics represent, for each one of the set of tasks, a further weighted sum of the task priority parameter and the cost parameter. In addition or in alternative to and in any combination with the optional features previously explained in this paragraph, the processing circuitry is configured to calculate a route for one of the plurality of autonomous agents to follow to perform a respective allocated one of the set of tasks based upon network connectivity in the environment and a congestion along the route caused by the presence of obstacles in the environment. In addition or in alternative to and in any combination with the optional features previously explained in this paragraph, the processing circuitry is configured to calculate the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor. In addition or in alternative to and in any combination with the optional features previously explained in this paragraph, each one of the plurality of routes comprises a plurality of cells, and the processing circuitry is configured to calculate the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route. In addition or in alternative to and in any combination with the optional features previously explained in this paragraph, the processing circuitry is further configured to: calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and the generated autonomous agent allocation data that allocates each one of the plurality of autonomous agents to a respective one of the set of tasks is further based upon the expected probability of the one of the plurality of autonomous agents performing the allocated one of the set of tasks. In addition or in alternative to and in any combination with the optional features previously explained in this paragraph, the error metric is from among a set of error metrics calculated based upon a respective predetermined movement profile and a respective measured movement profile while the one of the plurality of autonomous agents previously performed different portions of the set of tasks, and the processing circuitry is further configured to subsequently generate further autonomous agent allocation data that allocates a respective one of the set of tasks to the one of the plurality of autonomous agents based upon the set of error metrics. In addition or in alternative to and in any combination with the optional features previously explained in this paragraph, the processing circuitry is configured to calculate a health metric for an autonomous agent from among the plurality of autonomous agents based upon a measured performance of the autonomous agent when performing previous tasks. In addition or in alternative to and in any combination with the optional features previously explained in this paragraph, the processing circuitry is further configured to: calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent. In addition or in alternative to and in any combination with the optional features previously explained in this paragraph, the computing device further includes a communication interface configured to receive task-identification data transmitted by an autonomous agent from among the plurality of autonomous agents, the task-identification data being indicative of a further task detected by the autonomous agent, and the autonomous agent acquires an image of an object in the environment, the autonomous agent detects the further task by comparing features extracted from the acquired image to features extracted from a matching image of the object accessed via a memory, and the processing circuitry is further configured to subsequently generate further autonomous agent task allocation data that allocates the further task to one of the plurality of autonomous agents based upon the task-identification data.

General Operation of an Edge Network Computing Device

An edge network computing device is provided. With reference to FIGS. 1 and 2 and the central controller, the edge network computing device includes processing circuitry configured to execute computer-readable instructions to cause the edge network computing device to: receive autonomous agent task data including (i) a set of tasks to be performed by a plurality of autonomous agents operating within an environment, and (ii) a set of task parameters identified with each respective one of the set of tasks, train a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network to the autonomous agent task data and to the set of target vectors, autonomous agent task allocation data that allocates each one of the plurality of autonomous agents to a respective one of the set of tasks; and a communication interface configured to transmit commands to each one of the plurality of autonomous agents to perform the respectively allocated tasks. Each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks. In addition or in alternative to and in any combination with the optional features previously explained in this paragraph, the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks. In addition or in alternative to and in any combination with the optional features previously explained in this paragraph, the set of reward metrics represent, for each one of the set of tasks, a further weighted sum of the task priority parameter and the cost parameter. In addition or in alternative to and in any combination with the optional features previously explained in this paragraph, the processing circuitry is configured to calculate a route for one of the plurality of autonomous agents to follow to perform a respective allocated one of the set of tasks based upon network connectivity in the environment and a congestion along the route caused by the presence of obstacles in the environment. In addition or in alternative to and in any combination with the optional features previously explained in this paragraph, the processing circuitry is configured to calculate the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor. In addition or in alternative to and in any combination with the optional features previously explained in this paragraph, each one of the plurality of routes comprises a plurality of cells, and the processing circuitry is configured to calculate the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route. In addition or in alternative to and in any combination with the optional features previously explained in this paragraph, the processing circuitry is configured to: calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and the generated autonomous agent allocation data that allocates each one of the plurality of autonomous agents to a respective one of the set of tasks is further based upon the expected probability of the one of the plurality of autonomous agents performing the allocated one of the set of tasks. In addition or in alternative to and in any combination with the optional features previously explained in this paragraph, the error metric is from among a set of error metrics calculated based upon a respective predetermined movement profile and a respective measured movement profile while the one of the plurality of autonomous agents previously performed different portions of the set of tasks, and the processing circuitry is further configured to subsequently generate further autonomous agent allocation data that allocates a respective one of the set of tasks to the one of the plurality of autonomous agents based upon the set of error metrics. In addition or in alternative to and in any combination with the optional features previously explained in this paragraph, the processing circuitry is configured to calculate a health metric for an autonomous agent from among the plurality of autonomous agents based upon a measured performance of the autonomous agent when performing previous tasks. In addition or in alternative to and in any combination with the optional features previously explained in this paragraph, the processing circuitry is further configured to: calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent. In addition or in alternative to and in any combination with the optional features previously explained in this paragraph: the communication interface is configured to receive task-identification data transmitted by an autonomous agent from among the plurality of autonomous agents, the task-identification data being indicative of a further task detected by the autonomous agent, the autonomous agent acquires an image of an object in the environment, the autonomous agent detects the further task by comparing features extracted from the acquired image to features extracted from a matching image of the object accessed via a memory, and the neural network is further configured to subsequently generate further autonomous agent task allocation data that allocates the further task to one of the plurality of autonomous agents based upon the task-identification data.

MRTA System Simulation Data

Figure 13:
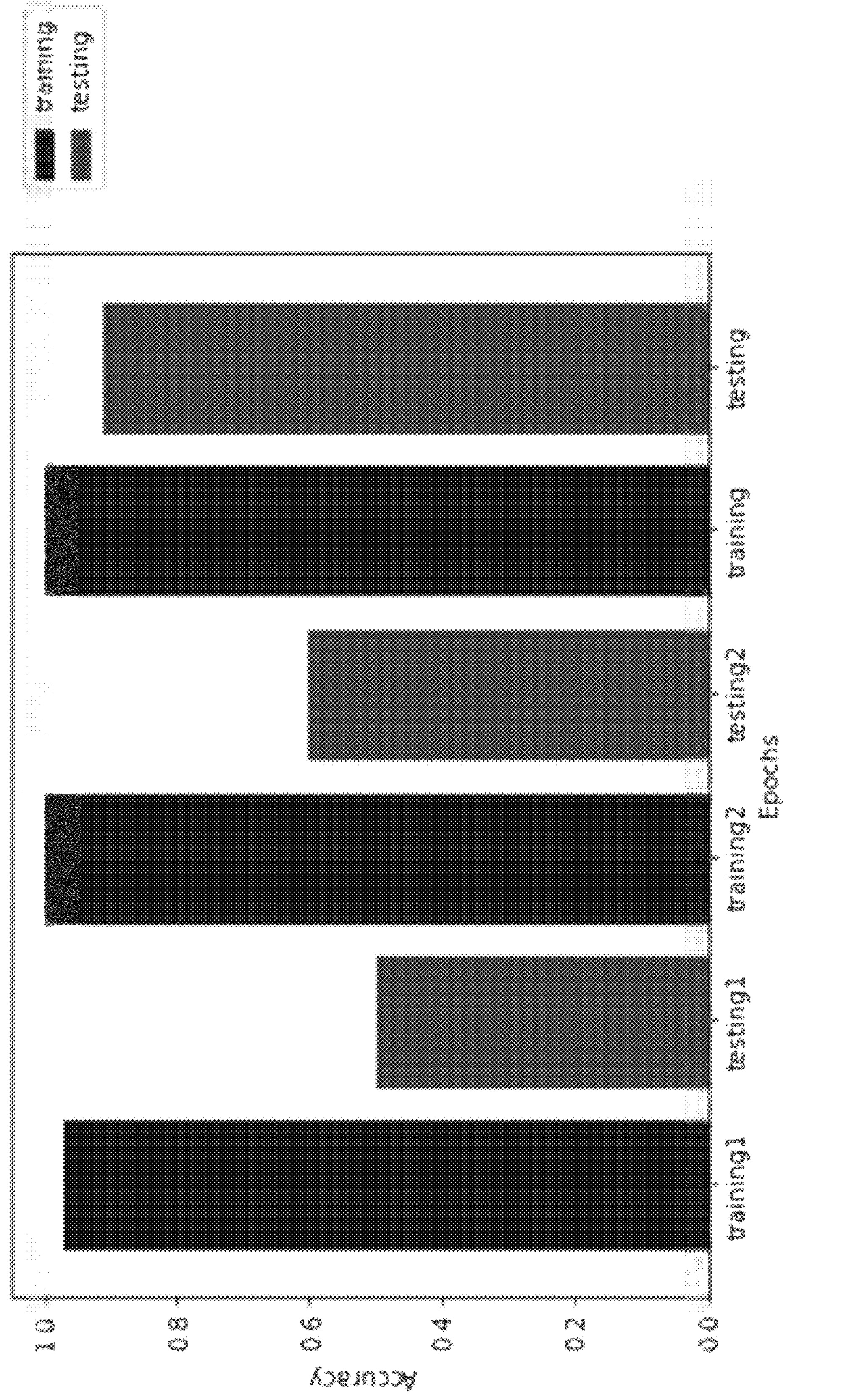
FIG. 13 illustrates a success rate plot comparing different test results for various epochs, in accordance with the disclosure.

FIG. 13 illustrates a success rate plot comparing different test results for various epochs, in accordance with the disclosure. The results as shown in FIG. 13 represent a success rate estimation for a DL-based model for AMR allocation to tasks via the trained DL neural network implemented via the task allocation engine block 210 as discussed herein. With reference to FIG. 13, the leftmost pairing represents 10,000 epochs, the center pairing represents 20,000 epochs, and the rightmost pairing represents 30,000 epochs.

Figure 14:
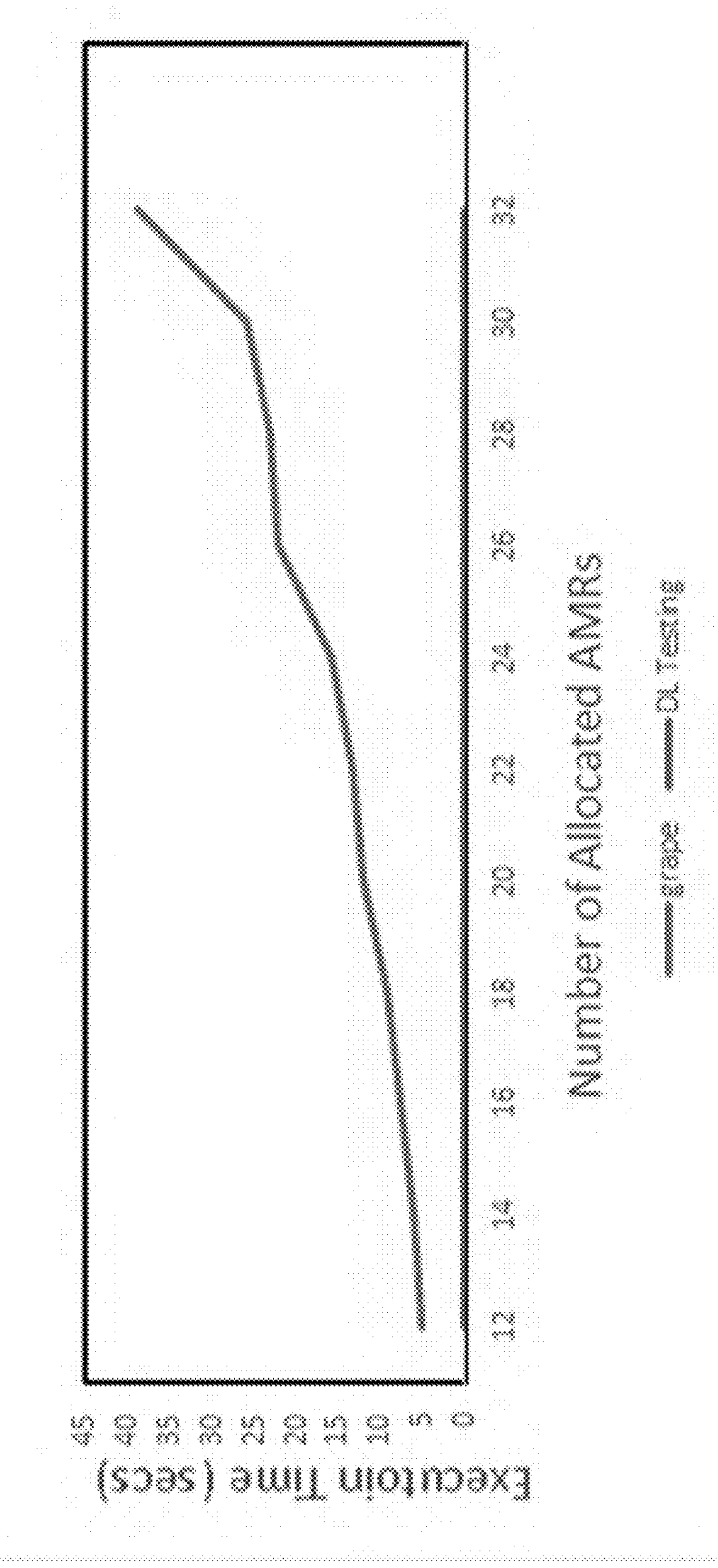
FIG. 14 illustrates a comparison of latency of a DL-based model for AMR allocation to tasks to conventional algorithms, in accordance with the disclosure.

FIG. 14 illustrates a comparison of latency of a DL-based model for AMR allocation to tasks to conventional algorithms, in accordance with the disclosure. In particular, FIG. 14 represents a latency comparison between via the trained DL neural network implemented via the task allocation engine block 210 as discussed herein to conventional algorithms.

FIG. 15 illustrates a table comparison between the performances of a DL-based resource allocation algorithm to that of a conventional algorithm, in accordance with the disclosure. In particular, FIG. 15 represents a latency comparison between the trained DL neural network implemented via the task allocation engine block 210 as discussed herein to a conventional GRAPE algorithm. As shown in FIGS. 14 and 15, the trained DL neural network implemented via the task allocation engine block 210 requires significantly lower latencies for the identical multi-task resource allocation scenarios. The latency reductions range from 1000× to 10,000× as the number of AMRs are increased.

EXAMPLES

The following examples pertain to various techniques of the present disclosure.

An example (e.g. example 1) relates to a computing device. The computing device includes a memory configured to store computer-readable instructions; and processing circuitry configured to execute the computer-readable instructions to cause the computing device to: receive autonomous agent task data including (i) a set of tasks to be performed by a plurality of autonomous agents operating within an environment, and (ii) a set of task parameters identified with each respective one of the set of tasks, training a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network, to the autonomous agent task data and to the set of target vectors, autonomous agent task allocation data that allocates each one of the plurality of autonomous agents to a respective one of the set of tasks.

Another example (e.g. example 2) relates to a previously-described example (e.g. example 1), wherein each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks.

Another example (e.g. example 3) relates to a previously-described example (e.g. one or more of examples 1-2), wherein the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks.

Another example (e.g. example 4) relates to a previously-described example (e.g. one or more of examples 1-3), wherein the set of reward metrics represent, for each one of the set of tasks, a further weighted sum of the task priority parameter and the cost parameter.

Another example (e.g. example 5) relates to a previously-described example (e.g. one or more of examples 1-4), wherein the processing circuitry is configured to calculate a route for one of the plurality of autonomous agents to follow to perform a respective allocated one of the set of tasks based upon network connectivity in the environment and a congestion along the route caused by the presence of obstacles in the environment.

Another example (e.g. example 6) relates to a previously-described example (e.g. one or more of examples 1-5), wherein the processing circuitry is configured to calculate the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor.

Another example (e.g. example 7) relates to a previously-described example (e.g. one or more of examples 1-6), wherein each one of the plurality of routes comprises a plurality of cells, and wherein the processing circuitry is configured to calculate the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route.

Another example (e.g. example 8) relates to a previously-described example (e.g. one or more of examples 1-7), wherein the processing circuitry is further configured to: calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

Another example (e.g. example 9) relates to a previously-described example (e.g. one or more of examples 1-8), wherein the error metric is from among a set of error metrics calculated based upon a respective predetermined movement profile and a respective measured movement profile while the one of the plurality of autonomous agents previously performed different portions of the set of tasks, and wherein the processing circuitry is further configured to subsequently generate further autonomous agent allocation data that allocates a respective one of the set of tasks to the one of the plurality of autonomous agents based upon the set of error metrics.

Another example (e.g. example 10) relates to a previously-described example (e.g. one or more of examples 1-9), wherein the processing circuitry is configured to calculate a health metric for an autonomous agent from among the plurality of autonomous agents based upon a measured performance of the autonomous agent when performing previous tasks.

Another example (e.g. example 11) relates to a previously-described example (e.g. one or more of examples 1-10), wherein the processing circuitry is further configured to: calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent.

Another example (e.g. example 12) relates to a previously-described example (e.g. one or more of examples 1-11), further comprising: a communication interface configured to receive task-identification data transmitted by an autonomous agent from among the plurality of autonomous agents, the task-identification data being indicative of a further task detected by the autonomous agent, wherein: the autonomous agent acquires an image of an object in the environment, the autonomous agent detects the further task by comparing features extracted from the acquired image to features extracted from a matching image of the object accessed via a memory, and the processing circuitry is further configured to subsequently generate further autonomous agent task allocation data that allocates the further task to one of the plurality of autonomous agents based upon the task-identification data.

An example (e.g. example 13) relates to an edge network computing device. The edge network computing device includes processing circuitry configured to execute computer-readable instructions to cause the edge network computing device to: receive autonomous agent task data including (i) a set of tasks to be performed by a plurality of autonomous agents operating within an environment, and (ii) a set of task parameters identified with each respective one of the set of tasks, train a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network to the autonomous agent task data and to the set of target vectors, autonomous agent task allocation data that allocates each one of the plurality of autonomous agents to a respective one of the set of tasks; and a communication interface configured to transmit commands to each one of the plurality of autonomous agents to perform the respectively allocated tasks.

Another example (e.g. example 14) relates to a previously-described example (e.g. example 13), wherein each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks.

Another example (e.g. example 15) relates to a previously-described example (e.g. one or more of examples 13-14), wherein the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks.

Another example (e.g. example 16) relates to a previously-described example (e.g. one or more of examples 13-15), wherein the set of reward metrics represent, for each one of the set of tasks, a further weighted sum of the task priority parameter and the cost parameter.

Another example (e.g. example 17) relates to a previously-described example (e.g. one or more of examples 13-16), wherein the processing circuitry is configured to calculate a route for one of the plurality of autonomous agents to follow to perform a respective allocated one of the set of tasks based upon network connectivity in the environment and a congestion along the route caused by the presence of obstacles in the environment.

Another example (e.g. example 18) relates to a previously-described example (e.g. one or more of examples 13-17), wherein the processing circuitry is configured to calculate the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor.

Another example (e.g. example 19) relates to a previously-described example (e.g. one or more of examples 13-18), wherein each one of the plurality of routes comprises a plurality of cells, and wherein the processing circuitry is configured to calculate the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route.

Another example (e.g. example 20) relates to a previously-described example (e.g. one or more of examples 13-19), wherein the processing circuitry is configured to: calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

Another example (e.g. example 21) relates to a previously-described example (e.g. one or more of examples 13-20), wherein the error metric is from among a set of error metrics calculated based upon a respective predetermined movement profile and a respective measured movement profile while the one of the plurality of autonomous agents previously performed different portions of the set of tasks, and wherein the processing circuitry is further configured to subsequently generate further autonomous agent allocation data that allocates a respective one of the set of tasks to the one of the plurality of autonomous agents based upon the set of error metrics.

Another example (e.g. example 22) relates to a previously-described example (e.g. one or more of examples 13-21), wherein the processing circuitry is configured to calculate a health metric for an autonomous agent from among the plurality of autonomous agents based upon a measured performance of the autonomous agent when performing previous tasks.

Another example (e.g. example 23) relates to a previously-described example (e.g. one or more of examples 13-22), wherein the processing circuitry is further configured to: calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent.

Another example (e.g. example 24) relates to a previously-described example (e.g. one or more of examples 13-23), wherein: the communication interface is configured to receive task-identification data transmitted by an autonomous agent from among the plurality of autonomous agents, the task-identification data being indicative of a further task detected by the autonomous agent, the autonomous agent acquires an image of an object in the environment, the autonomous agent detects the further task by comparing features extracted from the acquired image to features extracted from a matching image of the object accessed via a memory, and the neural network is further configured to subsequently generate further autonomous agent task allocation data that allocates the further task to one of the plurality of autonomous agents based upon the task-identification data.

An example (e.g. example 25) relates to a computing device. The computing device includes a storage means for storing computer-readable instructions; and processing means for executing the computer-readable instructions to cause the computing device to: receive autonomous agent task data including (i) a set of tasks to be performed by a plurality of autonomous agents operating within an environment, and (ii) a set of task parameters identified with each respective one of the set of tasks, training a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network, to the autonomous agent task data and to the set of target vectors, autonomous agent task allocation data that allocates each one of the plurality of autonomous agents to a respective one of the set of tasks.

Another example (e.g. example 26 relates to a previously-described example (e.g. example 25), wherein each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks.

Another example (e.g. example 27) relates to a previously-described example (e.g. one or more of examples 25-26), wherein the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks.

Another example (e.g. example 28) relates to a previously-described example (e.g. one or more of examples 25-27), wherein the set of reward metrics represent, for each one of the set of tasks, a further weighted sum of the task priority parameter and the cost parameter.

Another example (e.g. example 29) relates to a previously-described example (e.g. one or more of examples 25-28), wherein the processing means calculates a route for one of the plurality of autonomous agents to follow to perform a respective allocated one of the set of tasks based upon network connectivity in the environment and a congestion along the route caused by the presence of obstacles in the environment.

Another example (e.g. example 30) relates to a previously-described example (e.g. one or more of examples 25-29), wherein the processing means calculates the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor.

Another example (e.g. example 31) relates to a previously-described example (e.g. one or more of examples 25-30), wherein each one of the plurality of routes comprises a plurality of cells, and wherein the processing means calculates the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route.

Another example (e.g. example 32) relates to a previously-described example (e.g. one or more of examples 25-31), wherein the processing means: calculates an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

Another example (e.g. example 33) relates to a previously-described example (e.g. one or more of examples 25-32), wherein the error metric is from among a set of error metrics calculated based upon a respective predetermined movement profile and a respective measured movement profile while the one of the plurality of autonomous agents previously performed different portions of the set of tasks, and wherein the processing means subsequently generates further autonomous agent allocation data that allocates a respective one of the set of tasks to the one of the plurality of autonomous agents based upon the set of error metrics.

Another example (e.g. example 34) relates to a previously-described example (e.g. one or more of examples 25-33), wherein the processing means calculates a health metric for an autonomous agent from among the plurality of autonomous agents based upon a measured performance of the autonomous agent when performing previous tasks.

Another example (e.g. example 35) relates to a previously-described example (e.g. one or more of examples 25-34), wherein the processing means: calculates an expected probability of task completion for the autonomous agent from among the plurality of autonomous agents to perform an allocated one of the set of tasks, and subsequently generates further autonomous agent allocation data that allocates a respective one of the set of tasks to the one of the plurality of autonomous agents based upon the health metric and/or the expected probability of task completion for the autonomous agent.

Another example (e.g. example 36) relates to a previously-described example (e.g. one or more of examples 25-35), further comprising: a communication means for receiving task-identification data transmitted by an autonomous agent from among the plurality of autonomous agents, the task-identification data being indicative of a further task detected by the autonomous agent, wherein: the autonomous agent acquires an image of an object in the environment, the autonomous agent detects the further task by comparing features extracted from the acquired image to features extracted from a matching image of the object accessed via a memory, and the processing circuitry is further configured to subsequently generate further autonomous agent task allocation data that allocates the further task to one of the plurality of autonomous agents based upon the task-identification data.

An example (e.g. example 37) relates to an edge network computing device. The edge network computing device includes processing means for executing computer-readable instructions to cause the edge network computing device to: receive autonomous agent task data including (i) a set of tasks to be performed by a plurality of autonomous agents operating within an environment, and (ii) a set of task parameters identified with each respective one of the set of tasks, train a neural network using a training dataset that includes a set of target vectors representing an allocation of an autonomous agent to each respective one of the set of tasks based upon a set of reward metrics, each reward metric from among the set of reward metrics corresponding to a result of allocating one of the plurality of autonomous agents to perform each respective one of the set of tasks; and generate, by applying the trained neural network to the autonomous agent task data and to the set of target vectors, autonomous agent task allocation data that allocates each one of the plurality of autonomous agents to a respective one of the set of tasks; and a communication means for transmitting commands to each one of the plurality of autonomous agents to perform the respectively allocated tasks.

Another example (e.g. example 38) relates to a previously-described example (e.g. example 37), wherein each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks.

Another example (e.g. example 39) relates to a previously-described example (e.g. one or more of examples 37-38), wherein the training dataset is generated by: calculating, for each one of the set of tasks, a respective set of reward metrics that assigns a reward metric to each one of the plurality of autonomous agents for potentially performing the respective task; and determining a respective target vector for each one of the set of tasks by allocating an autonomous agent from among the plurality of autonomous agents having the highest respective calculated reward metric for each one of the set of tasks.

Another example (e.g. example 40) relates to a previously-described example (e.g. one or more of examples 37-39), wherein the set of reward metrics represent, for each one of the set of tasks, a further weighted sum of the task priority parameter and the cost parameter.

Another example (e.g. example 41) relates to a previously-described example (e.g. one or more of examples 37-40), wherein the processing means calculates a route for one of the plurality of autonomous agents to follow to perform a respective allocated one of the set of tasks based upon network connectivity in the environment and a congestion along the route caused by the presence of obstacles in the environment.

Another example (e.g. example 42) relates to a previously-described example (e.g. one or more of examples 37-41), wherein the processing means calculates the route by: eliminating cells within a map of the environment having a wireless connectivity metric that is less than a threshold value to provide a subset of cells; calculating a plurality of routes within the subset of cells; for each one of the plurality of routes, calculating a congestion factor based upon cells along each respective route that are occupied by objects; and selecting, as the calculated route, a route from among the plurality of routes having a lowest congestion factor.

Another example (e.g. example 43) relates to a previously-described example (e.g. one or more of examples 37-42), wherein each one of the plurality of routes comprises a plurality of cells, and wherein the processing circuitry is configured to calculate the congestion factor for each one of the plurality of routes by: computing, for each one of the plurality of cells within a respective route, a congestion parameter based upon a proportion of a number of adjacent cells occupied by an object to a total number of the adjacent cells; and computing the congestion factor by aggregating the calculated congestion parameters of the plurality of cells along the respective route.

Another example (e.g. example 44) relates to a previously-described example (e.g. one or more of examples 37-43), wherein the processing means: calculates an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

Another example (e.g. example 45) relates to a previously-described example (e.g. one or more of examples 37-44), wherein the error metric is from among a set of error metrics calculated based upon a respective predetermined movement profile and a respective measured movement profile while the one of the plurality of autonomous agents previously performed different portions of the set of tasks, and wherein the processing means subsequently generates further autonomous agent allocation data that allocates a respective one of the set of tasks to the one of the plurality of autonomous agents based upon the set of error metrics.

Another example (e.g. example 46) relates to a previously-described example (e.g. one or more of examples 37-45), wherein the processing means calculates a health metric for an autonomous agent from among the plurality of autonomous agents based upon a measured performance of the autonomous agent when performing previous tasks.

Another example (e.g. example 47) relates to a previously-described example (e.g. one or more of examples 37-46), wherein the processing means: calculates an expected probability of task completion for the autonomous agent from among the plurality of autonomous agents to perform an allocated one of the set of tasks, and subsequently generates further autonomous agent allocation data that allocates a respective one of the set of tasks to the one of the plurality of autonomous agents based upon the health metric and/or the expected probability of task completion for the autonomous agent.

Another example (e.g. example 48) relates to a previously-described example (e.g. one or more of examples 37-47), wherein: the communication means receives task-identification data transmitted by an autonomous agent from among the plurality of autonomous agents, the task-identification data being indicative of a further task detected by the autonomous agent, the autonomous agent acquires an image of an object in the environment, the autonomous agent detects the further task by comparing features extracted from the acquired image to features extracted from a matching image of the object accessed via a memory, and the neural network is further configured to subsequently generate further autonomous agent task allocation data that allocates the further task to one of the plurality of autonomous agents based upon the task-identification data.

An apparatus as shown and described.

A method as shown and described.

Conclusion

The embodiments described herein are by way of example and not limitation, and other embodiments may be implemented. For example, the various apparatuses (e.g. the AMRs and/or central controller) may perform specific functions and/or execute specific algorithms and/or instructions. These executable instructions and/or the resulting tasks may comprise additional embodiments with respect to the manner or method in which they are executed, independently of the particular component that is executing these processes/tasks.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:

a memory configured to store computer-readable instructions; and processing circuitry configured to execute the computer-readable instructions to cause the computing device to:

receive autonomous agent task data including (i) a set of tasks to be performed by a plurality of autonomous agents operating within an environment, and (ii) a set of task parameters identified with each respective one of the set of tasks, train a neural network using a training dataset that includes a set of target vectors representing an allocation of an autonomous agent to each respective one of the set of tasks based upon a set of reward metrics, wherein the training dataset is generated by:

calculating, for each one of the set of tasks, a respective set of reward metrics that assigns a reward metric to each one of the plurality of autonomous agents for potentially performing the respective task by computationally determining a result of allocating each autonomous agent to the respective task based on (i) the task parameters, and (ii) cost factors associated with respective ones of the plurality of autonomous agents; and determining a respective target vector for each one of the set of tasks by allocating an autonomous agent from among the plurality of autonomous agents having the highest respective calculated reward metric for each one of the set of tasks, and wherein each reward metric from among the set of reward metrics corresponds to a result of allocating one of the plurality of autonomous agents to perform each respective one of the set of tasks;

generate, by providing (i) the autonomous agent task data and the set of target vectors as inputs to an input layer of the trained neural network, and (ii) autonomous agent task allocation data as an output of an output layer of the trained neural network, the autonomous agent task allocation data representing an allocation of each one of the plurality of autonomous agents to a respective one of the set of tasks; and calculate a route for the plurality of autonomous agents to follow to perform their respectively allocated one of the set of tasks, and transmit route data to the plurality of autonomous agents to cause the plurality of autonomous agents to traverse respective routes, wherein the calculation of the route is performed based upon a model of the environment that is shared among the plurality of autonomous agents and comprises a plurality of cells having a predetermined size, the model of the environment including (i) a cell location of the plurality of cells that is occupied by the plurality of autonomous agents within the environment, and (ii) a mapping of one or more wireless communication metric values to respective cells of the plurality of cells based upon measurements performed by the plurality of autonomous agents in the environment as commanded by the computing device, wherein the model of the environment used for the calculation of the route is updated over time as the plurality of autonomous agents move among different cells within the environment, and wherein the route traversed by the plurality of autonomous agents comprises respective cells in the environment having one or more wireless communication metrics in excess of one or more respective predetermined thresholds.

2. The computing device of claim 1, wherein each reward metric corresponds to a result of allocating, for each one of the set of tasks, one of the plurality of autonomous agents to perform the each respective one of the set of tasks using (i) a task priority parameter that represents a weighted sum of the set of task parameters for each respective one of the set of tasks, and (ii) a cost parameter that represents a weighted sum of a set of cost factors, each respective one of the set of cost factors being identified with a different state of a respective one of the plurality of autonomous agents when allocated to perform each respective one of the set of tasks.

3. The computing device of claim 2, wherein the set of reward metrics represent, for each one of the set of tasks, a further weighted sum of the task priority parameter and the cost parameter.

4. The computing device of claim 1, wherein the processing circuitry is configured to calculate the route for one of the plurality of autonomous agents to follow to perform the respective allocated one of the set of tasks further based upon a presence of obstacles in the environment.

5. The computing device of claim 4, wherein the processing circuitry is configured to calculate the route by:

eliminating cells having a wireless connectivity metric that is less than a threshold value to provide a subset of cells;

calculating a plurality of routes within the subset of cells;

for each one of the plurality of routes, calculating a congestion factor based upon cells along each respective route that are occupied by objects; and selecting, as the calculated route, a route from among the plurality of routes having a lowest congestion factor.

6. The computing device of claim 5, wherein the processing circuitry is configured to calculate the congestion factor for each one of the plurality of routes by:

computing, for each cell of a respective route, a congestion parameter based upon a proportion of a number of adjacent cells occupied by an object to a total number of the adjacent cells; and computing the congestion factor by aggregating calculated congestion parameters of cells along the respective route.

7. The computing device of claim 1, wherein the processing circuitry is further configured to:

calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

8. The computing device of claim 7, wherein the error metric is from among a set of error metrics calculated based upon a respective predetermined movement profile and a respective measured movement profile with respect to when the one of the plurality of autonomous agents previously performed different portions of the set of tasks, and wherein the processing circuitry is further configured to subsequently generate further autonomous agent allocation data that allocates a respective one of the set of tasks to the one of the plurality of autonomous agents based upon the set of error metrics.

9. The computing device of claim 1, wherein the processing circuitry is configured to calculate a health metric for an autonomous agent from among the plurality of autonomous agents based upon a measured performance of the autonomous agent when performing previous tasks.

10. The computing device of claim 9, wherein the processing circuitry is further configured to:

calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent.

11. The computing device of claim 1, further comprising:

a communication interface configured to receive task-identification data transmitted by an autonomous agent from among the plurality of autonomous agents, the task-identification data being indicative of a further task detected by the autonomous agent, wherein:

the autonomous agent acquires an image of an object in the environment, the autonomous agent detects the further task by comparing features extracted from the acquired image to features extracted from a matching image of the object accessed via a memory, and the processing circuitry is further configured to subsequently generate further autonomous agent task allocation data that allocates the further task to one of the plurality of autonomous agents based upon the task-identification data.

12. An edge network computing device, comprising:

processing circuitry configured to execute computer-readable instructions to cause the edge network computing device to:

receive autonomous agent task data including (i) a set of tasks to be performed by a plurality of autonomous agents operating within an environment, and (ii) a set of task parameters identified with each respective one of the set of tasks, train a neural network using a training dataset that includes a set of target vectors representing an allocation of an autonomous agent to each respective one of the set of tasks based upon a set of reward metrics, wherein the training dataset is generated by:

calculating, for each one of the set of tasks, a respective set of reward metrics that assigns a reward metric to each one of the plurality of autonomous agents for potentially performing the respective task by computationally determining a result of allocating each autonomous agent to the respective task based on (i) the task parameters, and (ii) cost factors associated with respective ones of the plurality of autonomous agents; and determining a respective target vector for each one of the set of tasks by allocating an autonomous agent from among the plurality of autonomous agents having the highest respective calculated reward metric for each one of the set of tasks, and wherein each reward metric from among the set of reward metrics corresponds to a result of allocating one of the plurality of autonomous agents to perform each respective one of the set of tasks; and generate, by providing the (i) autonomous agent task data and the set of target vectors as inputs to an input layer of the trained neural network, and (ii) autonomous agent task allocation data as an output of an output layer of the trained neural network, the autonomous agent task allocation data representing an allocation of each one of the plurality of autonomous agents to a respective one of the set of tasks; and calculate a route for the plurality of autonomous agents to follow to perform their respectively allocated one of the set of tasks; and a communication interface configured to transmit commands to each one of the plurality of autonomous agents to cause the plurality of autonomous agents to traverse their respectively calculated routes and to perform their respectively allocated tasks along their respective routes, wherein the calculation of the route is performed based upon a model of the environment that is shared among the plurality of autonomous agents and comprises a plurality of cells having a predetermined size, the model of the environment including (i) a cell location of the plurality of cells that is occupied by the plurality of autonomous agents within the environment, and (ii) a mapping of one or more wireless communication metric values to respective cells of the plurality of cells based upon measurements performed by the plurality of autonomous agents in the environment as commanded by the computing device, wherein the model of the environment used for the calculation of the route is updated over time as the plurality of autonomous agents move among different cells within the environment, and wherein the route traversed by the plurality of autonomous agents comprises respective cells in the environment having one or more wireless communication metrics in excess of one or more respective predetermined thresholds.

13. The edge network computing device of claim 12, wherein each reward metric corresponds to a result of allocating, for each one of the set of tasks, one of the plurality of autonomous agents to perform the respective one of the set of tasks using (i) a task priority parameter that represents a weighted sum of the set of task parameters for the respective one of the set of tasks, and (ii) a cost parameter that represents a weighted sum of a set of cost factors, each respective one of the set of cost factors being identified with a different state of a respective one of the plurality of autonomous agents when allocated to perform the respective one of the set of tasks.

14. The edge network computing device of claim 13, wherein the set of reward metrics represent, for each one of the set of tasks, a further weighted sum of the task priority parameter and the cost parameter.

15. The edge network computing device of claim 12, wherein the processing circuitry is configured to calculate the route for one of the plurality of autonomous agents to follow to perform the respective allocated one of the set of tasks further based upon congestion along the route caused by a presence of obstacles in the environment.

16. The edge network computing device of claim 15, wherein the processing circuitry is configured to calculate the route by:

eliminating cells having a wireless connectivity metric that is less than a threshold value to provide a subset of cells;

calculating a plurality of routes within the subset of cells;

for each one of the plurality of routes, calculating a congestion factor based upon cells along each respective route that are occupied by objects; and selecting, as the calculated route, a route from among the plurality of routes having a lowest congestion factor.

17. The edge network computing device of claim 16, wherein the processing circuitry is configured to calculate the congestion factor for each one of the plurality of routes by:

computing, for each cell of a respective route, a congestion parameter based upon a proportion of a number of adjacent cells occupied by an object to a total number of the adjacent cells; and computing the congestion factor by aggregating calculated congestion parameters of cells along the respective route.

18. The edge network computing device of claim 12, wherein the processing circuitry is configured to:

calculate an expected probability of task completion for one of the plurality of autonomous agents to perform an allocated one of the set of tasks by calculating an error metric with respect to a deviation between a predetermined movement profile and a measured movement profile while previously performing tasks from among the set of tasks, and wherein the generated autonomous agent allocation data that allocates each one of the plurality of autonomous agents to a respective one of the set of tasks is further based upon the expected probability of the one of the plurality of autonomous agents performing the allocated one of the set of tasks.

19. The edge network computing device of claim 18, wherein the error metric is from among a set of error metrics calculated based upon a respective predetermined movement profile and a respective measured movement profile with respect to when the one of the plurality of autonomous agents previously performed different portions of the set of tasks, and wherein the processing circuitry is further configured to subsequently generate further autonomous agent allocation data that allocates a respective one of the set of tasks to the one of the plurality of autonomous agents based upon the set of error metrics.

20. The edge network computing device of claim 12, wherein the processing circuitry is configured to calculate a health metric for an autonomous agent from among the plurality of autonomous agents based upon a measured performance of the autonomous agent when performing previous tasks.

21. The edge network computing device of claim 20, wherein the processing circuitry is further configured to:

calculate an expected probability of task completion for the autonomous agent from among the plurality of autonomous agents to perform an allocated one of the set of tasks, and subsequently generate further autonomous agent allocation data that allocates a respective one of the set of tasks to the one of the plurality of autonomous agents based upon the health metric and/or the expected probability of task completion for the autonomous agent.

22. The edge network computing device of claim 12, wherein:

the communication interface is configured to receive task-identification data transmitted by an autonomous agent from among the plurality of autonomous agents, the task-identification data being indicative of a further task detected by the autonomous agent, the autonomous agent acquires an image of an object in the environment, the autonomous agent detects the further task by comparing features extracted from the acquired image to features extracted from a matching image of the object accessed via a memory, and the neural network is further configured to subsequently generate further autonomous agent task allocation data that allocates the further task to one of the plurality of autonomous agents based upon the task-identification data.

23. The computing device of claim 1, wherein each target vector represents a calculated allocation of an autonomous agent to a respective task.

24. The computing device of claim 1, wherein the mapping of the one or more wireless communication metric values to the respective cells of the plurality of cells is based upon an aggregation of measurements performed by the plurality of autonomous agents in response to commands transmitted by the computing device to the plurality of autonomous agents to perform the measurements at specific cell locations over a period of time as the plurality of autonomous agents traverse different cells.

* * * * *